US011184457B2

(12) United States Patent
Smith et al.

(10) Patent No.: US 11,184,457 B2
(45) Date of Patent: Nov. 23, 2021

(54) INFORMATION-CENTRIC NETWORK DATA CACHE MANAGEMENT

(71) Applicant: Intel Corporation, Santa Clara, CA (US)

(72) Inventors: Ned M. Smith, Beaverton, OR (US); Srikathyayani Srikanteswara, Portland, OR (US); Kathiravetpillai Sivanesan, Portland, OR (US); Eve M. Schooler, Portola Valley, CA (US); Satish Chandra Jha, Hillsboro, OR (US); Stepan Karpenko, Hillsboro, OR (US); Zongrui Ding, Portland, OR (US); S M Iftekharul Alam, Hillsboro, OR (US); Yi Zhang, Portland, OR (US); Kuilin Clark Chen, Hillsboro, OR (US); Gabriel Arrobo Vidal, Hillsboro, OR (US); Qian Li, Beaverton, OR (US); Maria Ramirez Loaiza, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 16/455,442

(22) Filed: Jun. 27, 2019

(65) Prior Publication Data
US 2019/0327328 A1 Oct. 24, 2019

(51) Int. Cl.
*G06F 15/173* (2006.01)
*H04L 29/08* (2006.01)
(Continued)

(52) U.S. Cl.
CPC ...... *H04L 67/2842* (2013.01); *H04L 12/1432* (2013.01); *H04L 41/12* (2013.01);
(Continued)

(58) Field of Classification Search
CPC . H04L 67/2842; H04L 12/1432; H04L 41/12; H04L 41/5045; H04L 45/02; H04L 67/10
(Continued)

(56) References Cited

U.S. PATENT DOCUMENTS

2002/0087797 A1* 7/2002 Adrangi ................. H04L 63/10
711/133
2005/0262246 A1* 11/2005 Menon ................ H04L 67/1002
709/226
(Continued)

*Primary Examiner* — Kaylee J Huang
(74) *Attorney, Agent, or Firm* — Schwegman Lundberg & Woessner, P.A.

(57) ABSTRACT

Systems and techniques for information-centric network data cache management are described herein. A demand metric may be calculated for a content item requested from an information-centric network (ICN). A resistance metric may be calculated for each cache node of a set of cache nodes in the ICN based on the demand metric. A topology of the set of cache nodes may be evaluated to identify a transmission cost for each cache node of the set of cache nodes. An influencer node may be selected from the set of cache nodes based on the resistance metric for the influencer node and the transmission cost for the influencer node. The content item may be cached in a data cache of the influencer node.

21 Claims, 13 Drawing Sheets

(51) Int. Cl.
*H04L 12/751* (2013.01)
*H04L 12/24* (2006.01)
*H04L 12/14* (2006.01)

(52) U.S. Cl.
CPC .......... *H04L 41/5045* (2013.01); *H04L 45/02* (2013.01); *H04L 67/10* (2013.01)

(58) Field of Classification Search
USPC .................... 709/224, 217, 223, 226, 238
See application file for complete search history.

(56) References Cited

U.S. PATENT DOCUMENTS

| | | | |
|---|---|---|---|
| 2014/0173076 A1* | 6/2014 | Ravindran ............ | H04L 67/327 709/223 |
| 2017/0195375 A1* | 7/2017 | Thubert .............. | H04L 65/1069 |
| 2018/0145907 A1* | 5/2018 | Vannithamby .......... | H04L 45/14 |
| 2018/0167486 A1* | 6/2018 | Pacella ............... | H04L 67/2842 |
| 2019/0320016 A1* | 10/2019 | Yang ........................ | H04L 41/12 |
| 2019/0356473 A1* | 11/2019 | Rosenoer .............. | H04L 9/0643 |
| 2020/0005284 A1* | 1/2020 | Vijayan ................ | G06Q 20/065 |
| 2020/0042454 A1* | 2/2020 | Li ........................... | H04L 67/10 |

* cited by examiner

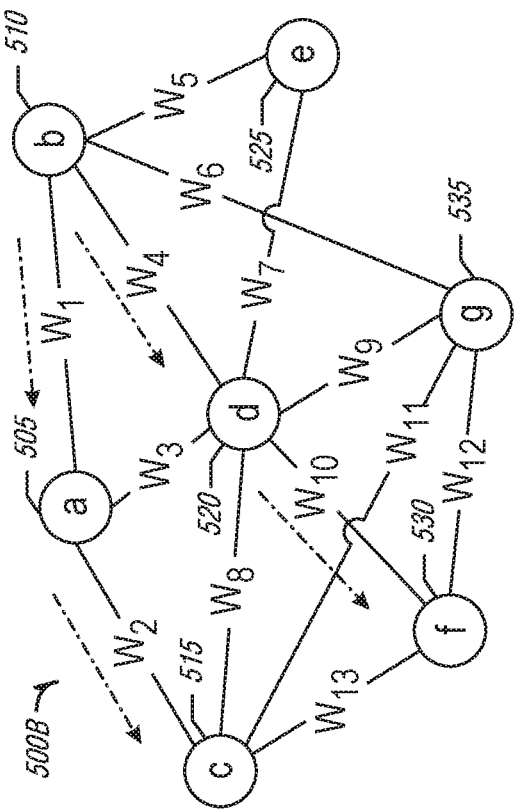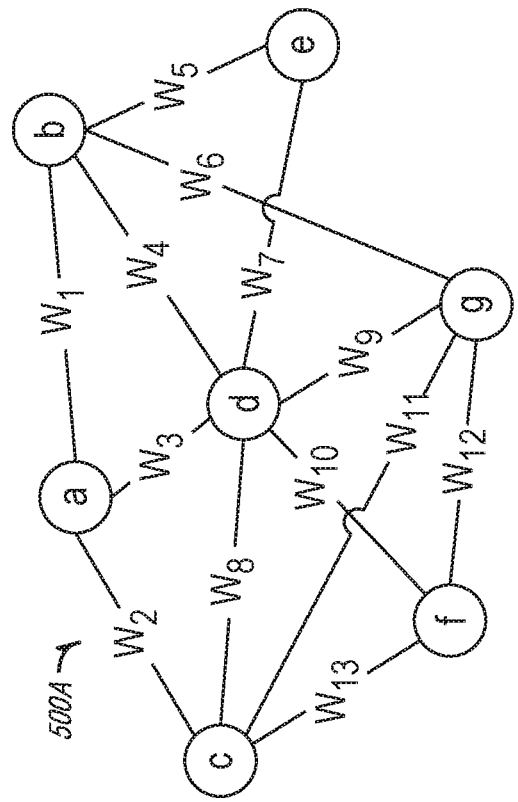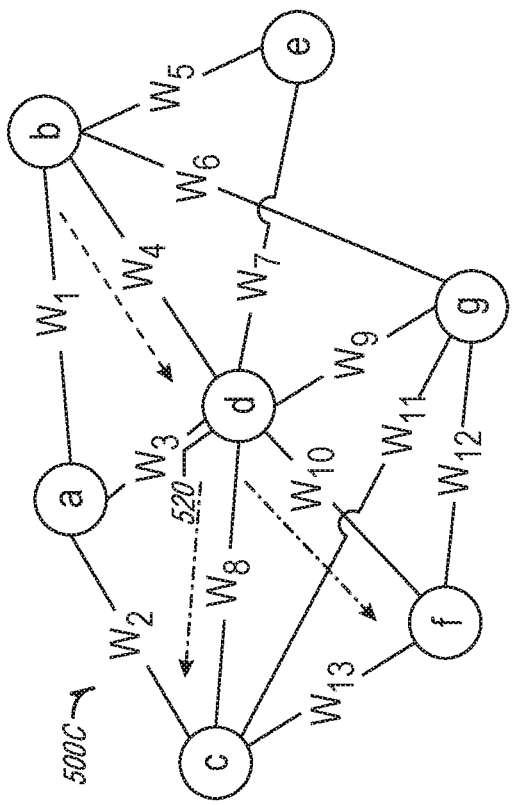
*FIG. 5B*
*FIG. 5A*
*FIG. 5C*

INFORMATION-CENTRIC NETWORK DATA CACHE MANAGEMENT

TECHNICAL FIELD

Embodiments described herein generally relate to information-centric networking and, in some embodiments, more specifically to managing data caches in information-centric data networks.

BACKGROUND

Client computing devices may be connected to data networks for accessing data that may be stored on a remote computing device. A request for data may travel through a collection of routing devices between a requesting client computing device and the remote computing device. Traditionally, the data may be requested by identifying the remote computing device by a hostname that may be resolved to a network address. The request may then be transmitted to the remote computing device via its network address.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5A illustrates an example of an underlying information diffusion network for information-centric network data cache management, according to an embodiment.

FIG. 5B illustrates an example of a response to a content request in an underlying information diffusion network for information-centric network data cache management, according to an embodiment.

FIG. 5C illustrates an example of cache location and content diffusion in an underlying information diffusion network for information-centric network data cache management, according to an embodiment.

DETAILED DESCRIPTION

An information-centric network (ICN) facilitates data fulfillment for client computing devices based on the data that is being requested rather than based on specifying a computing device hosting the data. This allows the data to be provided from a nearest storage source rather than traversing the network to retrieve data from a specified source.

In ICNs, caching is an important feature that allows the network to deliver data packets in a shorter time frame (e.g., through lower latency, etc.) and reduce network load (e.g., by reducing router hops, etc.). Lower latency is achieved by getting data from a node that is close to the consumer. For example, an interest packet (e.g., a request for data, etc.) may not have to go all the way to a producer (e.g., original source computing device, etc.), and the reduced network load is realized when data is retrieved from a node closer to the consumer because the packets do not need to traverse the entire network to reach the producer.

Moreover, ICNs may allow the user of general-purpose hardware (e.g., servers, desktops, etc.) with limited processing and storage capacity. The limited resources on the nodes participating in the ICN limit the amount and type of data that may be cached at the nodes. Therefore, managing cache placement and data delivery may allow an ICN operator to optimize the efficiency of data delivery of the ICN.

Traditional data caching mechanisms used in ICNs may be classified into the following groups: i) cache everything; ii) cache based on a probability; and iii) cache based on a flag/bit in packet. Previous solutions mainly focus on where to cache data based on probabilities, based on a flag added to packets, or based on a combination of these.

In contrast to the traditional data caching mechanisms, the systems and techniques discussed herein address the caching problem in an optimal manner. The concept of an influencer is taken from social networks to decide the node(s), also called influencer(s), that cache the data such as that the data gets delivered to consumer(s) in the most efficient way (e.g., delivering the data as fast as possible, optimizing utilization of links and computing resources of the nodes between the consumer(s) and the influencer, etc.).

Traditional networking architecture is based on the Internet Protocol (IP) and is host-centric. Thus, the communication is host-to-host and content delivery relies on sessions between two end points. Bottlenecks may be created anywhere in the network because multiple users might be requesting the same content, but the network has no knowledge of this, causing a non-optimal utilization of the link resources.

Figure 1:
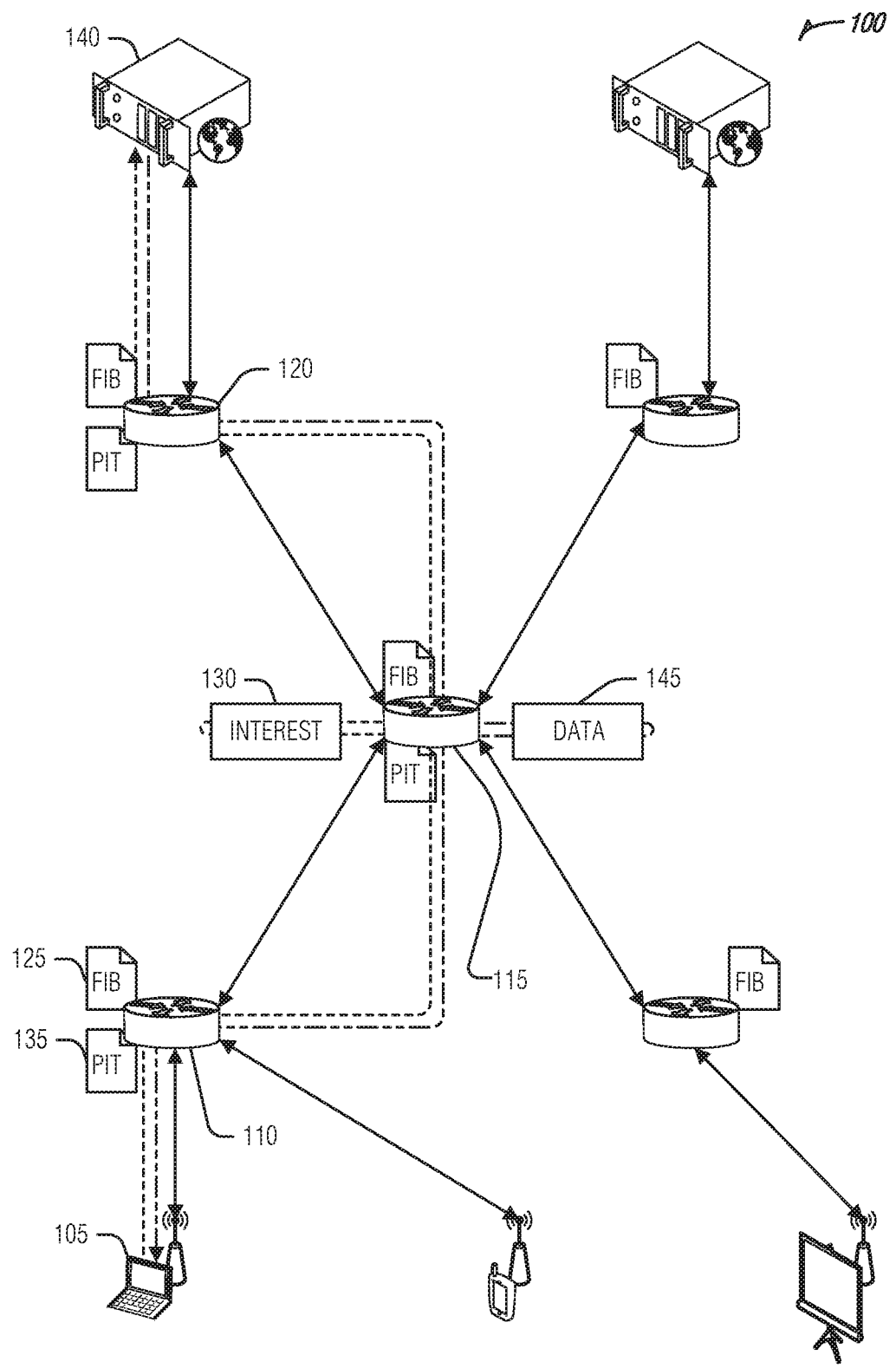
FIG. 1 illustrates an example of an information-centric network (ICN) that may utilize information-centric network data cache management, according to an embodiment.

FIG. 1 illustrates an example of an information-centric network (ICN) 100 that may utilize information-centric network data cache management, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 105 (e.g., subscriber) requests named content from the network itself. The content request may be called an interest and transmitted via an interest packet 130. As the interest packet traverses network devices (e.g., network elements, routers, switches, hubs, etc.)—such as network elements 110, 115, and 120—a record of the interest is kept, for example, in a pending interest table (PIT) at each network element. Thus, network element 110 maintains an entry in its PIT 135 for the interest packet 130, network element 115 maintains the entry in its PIT, and network element 120 maintains the entry in its PIT.

When a device, such as publisher 140, that has content matching the name in the interest packet 130 is encountered, that device 140 may send a data packet 145 in response to the interest packet 130. Typically, the data packet 145 is tracked back through the network to the source (e.g., device 105) by following the traces of the interest packet 130 left in the network element PITs. Thus, the PIT 135 at each network element establishes a trail back to the subscriber 105 for the data packet 145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 130 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 130 to data cached in the ICN element. Thus, for example, if the data 145 named in the interest 130 is cached in network element 115, then the network element 115 will return the data 145 to the subscriber 105 via the network element 110. However, if the data 145 is not cached at network element 115, the network element 115 routes the interest 130 on (e.g., to network element 120). To facilitate routing, the network elements may use a forwarding information base 125 (FIB) to match named data to an interface (e.g., physical port) for the route. Thus, the FIB 125 operates much like a routing table on a traditional network device.

In an example, additional meta-data may be attached to the interest packet 130, the cached data, or the route (e.g., in the FIB 125), to provide an additional level of matching. For example, the data name may be specified as "www.somedomain.com or videos or v8675309," but also include a version number—or timestamp, time range, endorsement, etc. In this example, the interest packet 130 may specify the desired name, the version number, or the version range. The matching may then locate routes or cached data matching the name and perform the additional comparison of meta-data or the like to arrive at an ultimate decision as to whether data or a route matches the interest packet 130 for respectively responding to the interest packet 130 with the data packet 145 or forwarding the interest packet 130.

ICN has advantages over host-based networking because the data segments are individually named. This enables aggressive caching throughout the network as a network element may provide a data packet 130 in response to an interest 130 as easily as an original author 140. Accordingly, it is less likely that the same segment of the network will transmit duplicates of the same data requested by different devices.

Fine grained encryption is another feature of many ICN networks. A typical data packet 145 includes a name for the data that matches the name in the interest packet 130. Further, the data packet 145 includes the requested data and may include additional information to filter similarly named data (e.g., by creation time, expiration time, version, etc.). To address malicious entities providing false information under the same name, the data packet 145 may also encrypt its contents with a publisher key or provide a cryptographic hash of the data and the name. Thus, knowing the key (e.g., from a certificate of an expected publisher 140) enables the recipient to ascertain whether the data is from that publisher 140. This technique also facilitates the aggressive caching of the data packets 145 throughout the network because each data packet 145 is self-contained and secure. In contrast, many host-based networks rely on encrypting a connection between two hosts to secure communications. This may increase latencies while connections are being established and may prevent data caching by hiding the data from the network elements.

Information-centric networking (ICN) is a networking platform that transitions from a host-centric content delivery model and to an information-centric model for content delivery. The end-to-end connectivity of modern computer networks allows for delivery of information that is independent of location, application, storage, and transportation means. Content is requested by a consumer device by submitting an interest packet that provides the information needed (e.g., a name, identifier, category, etc.) to retrieve content. In response, a node containing the content (e.g., a producer node, cache node, etc.) returns a data packet including the content. This reduces the reliance on specific hosts to provide content to a requester and allows data to be propagated throughout the ICN to nodes that may most efficiently delivery the content to consumer nodes. ICN may enable Named Data Networking (NDN) technology.

NDN, as specified in the NDN technical report DND-0001, is a networking architecture that enables communications by named secured data at the network layer. By aligning the network services with application needs, NDN may offer advantages over host-centric networks such as, for example, stronger security and trustworthiness, enhanced network usability, enhanced scalability, and increased resiliency in network communication. NDN is especially suitable for emerging network environments such as edge computing, Internet of Things (IoT), and other data intensive distributed networks.

Other example ICN networks include content centric networking (CCN), as specified in the Internet Engineering Task Force (IETF) draft specifications for CCNx 0.x and CCN 1.x, Data-Oriented Network Architecture (DONA), as presented at proceedings of the 2007 Association for Computing Machinery's (ACM) Special Interest Group on Data Communications (SIGCOMM) conference on Applications, technologies, architectures, and protocols for computer communications, Named Functions Networking (NFN), 4WARD, Content Aware Searching, Retrieval and Streaming (COAST), Convergence of Fixed and Mobile Broadband Access/Aggregation Networks (COMBO), Content Mediator Architecture for Content-Aware Networks (COMET), CONVERGENCE, GreenICN, Network of Information (NetInf), IP Over ICN (POINT), Publish-Subscribe Internet Routing Paradigm (PSIRP), Publish Subscribe Internet Technology (PURSUIT), Scalable and Adaptive Internet Solutions (SAIL), Universal, Mobile-Centric and Opportunistic Communications Architecture (UMOBILE), etc.

Figure 2:
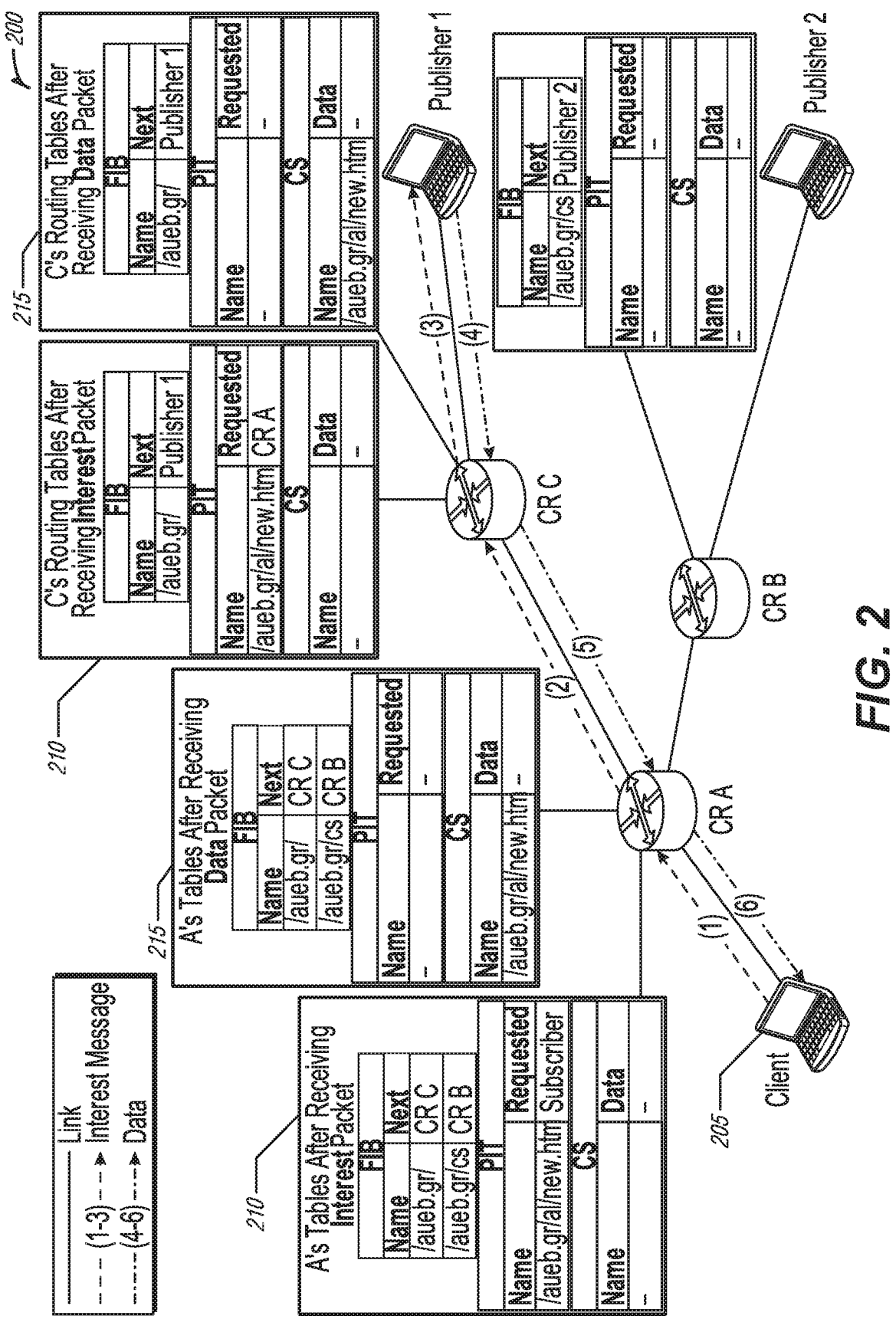
FIG. 2 illustrates an example of ICN request and response for content delivery for information-centric network data cache management, according to an embodiment.

FIG. 2 illustrates an example of ICN request and response for content delivery 200 for information-centric network data cache management, according to an embodiment. In ICN, access to the content is done through a pull-based model, where a client 205 (also known as a Consumer) sends interest packets 210 to the network requesting a given content and the network replies with the content that was requested (sending data packets). As shown in FIG. 2, a data packet 215 follows the same reverse path as its corresponding interest packet 210.

Figure 3:
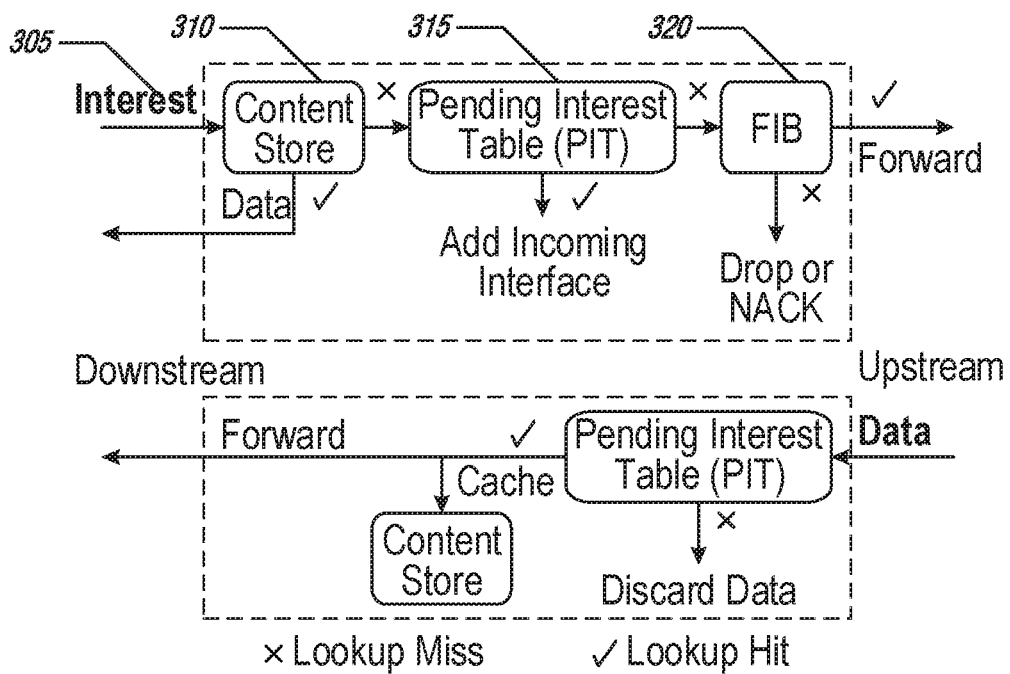
FIG. 3 illustrates an example of a forwarding process at a node for information-centric network data cache management, according to an embodiment.

FIG. 3 illustrates an example of a forwarding process 300 at a node for information-centric network data cache management, according to an embodiment. A benefit of ICN is that the nodes (in the network) are provided the ability to cache the data that is transmitted through them. However, the nodes are not able to access to the data itself because it is encrypted and only authorized users (e.g., consumers, etc.) are able to decrypt the data. That is, when a consumer requests data, the data may come from the server (e.g., a producer, etc.) or from a node that has a cached copy of the data. The process to retrieve data is as follows: i: When a node receives an ICN interest packet 305, it checks its Content Store (CS) 310 to see whether it already has the content cached, ii: If not, the interest packet is passed to the Pending Interest Table (PIT) 315 to find a matching name, and iii: If no match is found, the node records the interest in its PIT 315 and forwards the interest to the next hop(s) towards the requested content based on the information in its Forwarding Information Base (FIB) 320.

The systems and techniques discussed herein include a caching mechanism based on influence rather than probabilities or packet flags. The proposed cache placement mechanism is based on principles of network diffusion and contagion and uses an objective-based placement method to identify nodes that provide the optimal location content for caching. The best caching node is the one that satisfies conditions such as, for example: Node cache capacity: how much memory/storage space is available and how much is needed for the content; Node computation capacity: available computational power to retrieve the data packets from the cache and deliver the content with minimal latency through one or multiple faces; and Node available Bandwidth: available bandwidth to satisfy the content demand.

The influence-based cache placement mechanism borrows from social network theory to determine the best location for caching a specific content. In social networks, diffusion of information refers of how fast content may be spread across the network, for an ICN, the focus is on how fast an interest request may be satisfied. This considers the demand for the specific content, how likely is each node to share or not its capabilities/resources, and what nodes are best for spreading the information with optimal performance (e.g., minimal latency). The main elements used in determining a caching node are related propagation and diffusion of the content depending on several parameters. First, a demand metric where it is determined how desirable the content is that is circulating through the network (e.g., similar to how infectious a phenomenon is). Conversely, there is a resistance metric that indicates how reluctant nodes are to cache content (e.g., resistance to contagion). Second, the network topology influences the content diffusion and the nodes that are strategic influencers are selected to cache content.

Demand or infectiousness refers to content that is likely to be requested by a large number of consumers, regardless of the network. It also refers to how many nodes and consumers a node may serve at any given time. In contrast to demand, there is resistance from nodes to share their available capabilities/resources.

Network topology also influences the optimal location of content. Topology affects the average shortest (or cheapest) path which provides an estimate of how many hops are necessary for a piece of data to reach the consumers.

Figure 4:
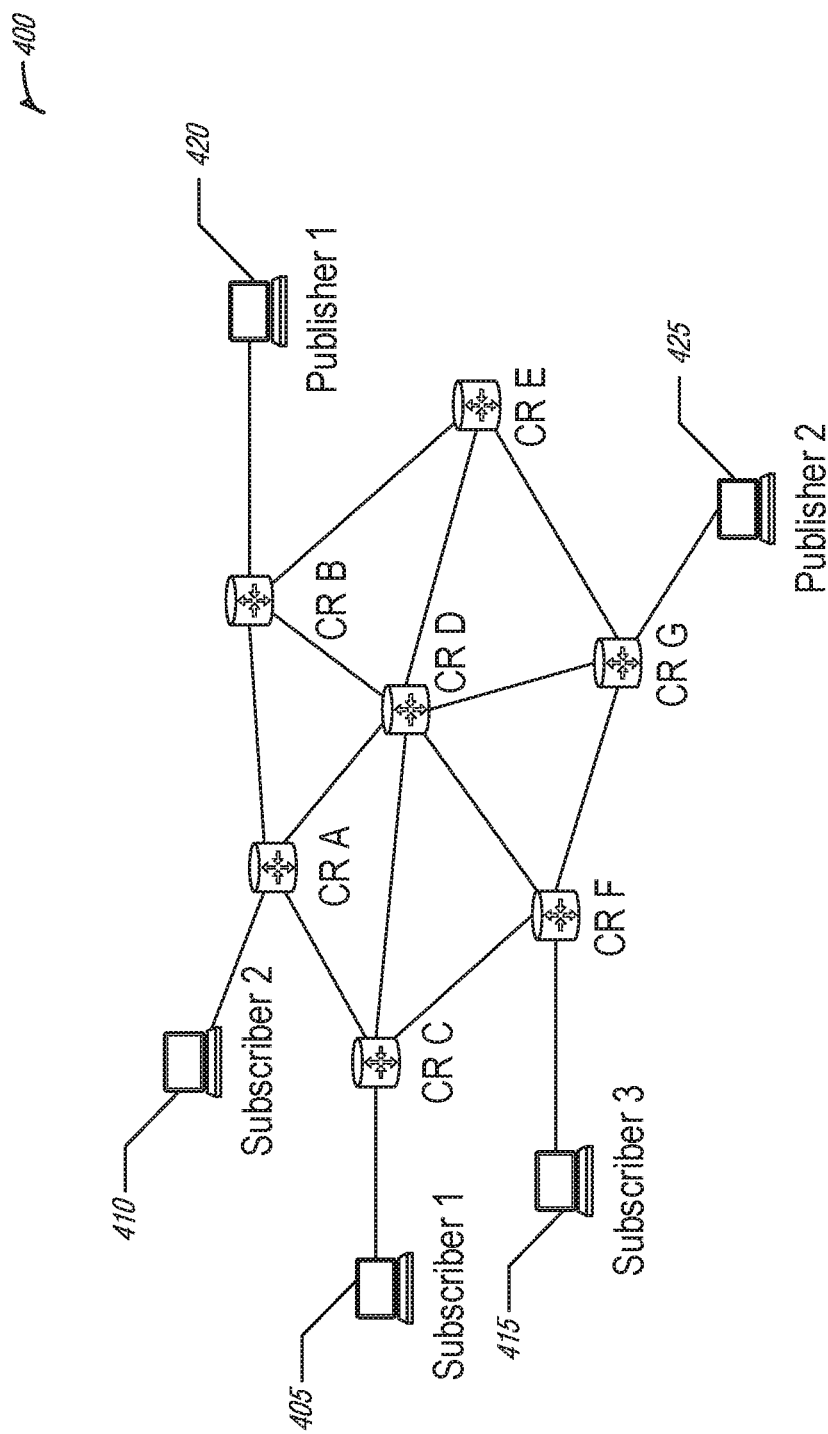
FIG. 4 illustrates an example of an ICN with publishers and subscribers for information-centric network data cache management, according to an embodiment.

FIG. 4 illustrates an example of an ICN 400 with publishers (e.g., publisher 1 420, publisher 2 425, etc.) and subscribers (e.g., subscriber 1 405, subscriber 2 410, subscriber 3 415, etc.) for information-centric network data cache management, according to an embodiment. In the ICN 400, the publishers host the content demanded by the subscribers. Furthermore, consider that the subscribers request the same content. The influence caching mechanism identifies the underlying information network in the communications network. The information network refers to how the information is requested and shared.

FIG. 5A illustrates an example of an underlying information diffusion network 500A for information-centric network data cache management, according to an embodiment. In the underlying information diffusion network 500A, each connection is weighted by the cost of using the connection. The cost may be defined with a variety of metric optimization techniques, such as latency.

Returning to the description of FIG. 4, at a given time, subscriber 1 405 and subscriber 3 415 may request the same content. The caching mechanism observes the content demand and calculates the cheapest path (e.g., cost and distance) from the publisher to the subscribers.

FIG. 5B illustrates an example of a response to a content request 500B in an underlying information diffusion network for information-centric network data cache management, according to an embodiment. The topology is analyzed along with the demand for the content and the capacity of each node in the paths from node b 510 (where the publisher is connected to) to node c 515 (e.g., the connection to subscriber 1 405 as described in FIG. 4) and node f 530 (e.g., the connection to subscriber 3 415 as described in FIG. 4). The demand of the content and influence capacity may be computed for node a 505, node d 520, node f 530, node g 535, and node c 515. The influence potential of each node determines whether they cache content or not. In this example, the node that provides minimal delay and maximum influence is node d 520. It is likely that a subscriber connected to node a 505 (e.g., subscriber 2 410 as described in FIG. 4, etc.) may request the same content in the near future making the cache placement in node d 520 optimal because it shares a path to each requesting node.

FIG. 5C illustrates an example of cache location and content diffusion 500C in an underlying information diffusion network for information-centric network data cache management, according to an embodiment. Node d 520 has already seen the content and does not need to request it again for storage.

Figure 6:
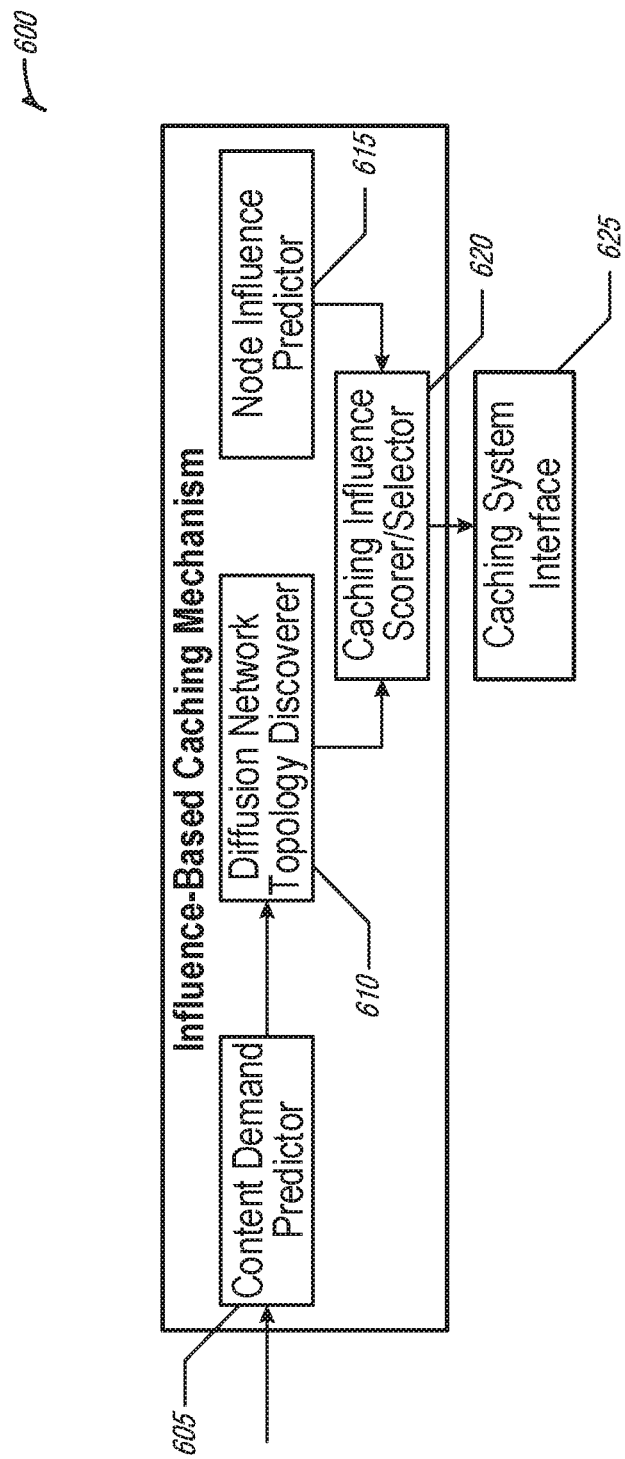
FIG. 6 illustrates an example of an influence-based caching mechanism for information-centric network data cache management, according to an embodiment.

FIG. 6 illustrates an example of an influence-based caching mechanism 600 for information-centric network data cache management, according to an embodiment. The influence-based caching mechanism may include a content demand predictor 605, a diffusion network topology discoverer 610, a node influence predictor 615, a caching influence scorer and selector 620, and a caching system interface 625.

The content demand predictor 605 keeps track of and evaluates content demand. The content demand predictor 605 determines how much demand a particular content will have in the near future using a variety of techniques such as, for example, a scoring value (e.g., zero to one), a discrete categorization (e.g., high vs. low), etc. If a content will be in high demand, then it will be more likely to be cached. The content demand predictor 605 may be implemented as a function that that scores the likability of the content. This could be done by using a variety of techniques such as, for example, a heuristic method (e.g., assign an equal likelihood to all content and give priority to most recent, analyzing historically which publishers are more popular in the network and prioritize their content, etc.)

The diffusion network topology discoverer 610 observes, records, and maintains the diffusion network topology. That is, how the information flows and what is the cost of diffusion based on the node computational capacity, storage capacity, distance to subscriber (number of hops), and available bandwidth (link capacity). In most cases, the topology will be equivalent to the actual network topology. However, the diffusion network topology discoverer 610 adds a reluctance score to each node that indicates how likely the node is to share or relay content to other nodes or subscribers as a cost or weight value to the network connections (e.g., edges in the graph). It may play the role of load balancer by assigning appropriate reluctance score to highly loaded nodes.

Each node maintains information about the diffusion network for its immediate neighborhood. If information for farther away nodes is needed, this may be done by using a predictive model. The node influence predictor 615 may determine and define the diffusion model of the network and may determine the capacity of each node to influence the network. By observing the information cascades, the information paths may be determined, and strategic nodes may be identified in the model. That is, the node influence predictor may provide routing benefits by updating/selecting the face(s) used to forward the interest packets (e.g., information paths).

The caching influence scorer and selector uses the input from the diffusion network topology discoverer 610, and the node influence predictor 615 to select the nodes with common nodes in the distribution paths, with the highest influence score, and the lowest diffusion cost (e.g., number of hops, capacity/bandwidth, and latency). A final score is calculated for its neighboring nodes, where the highest ranked nodes are preferred for caching the content. The selected cache locations are then passed through the caching system interface 625 to distribute the appropriate caches to the appropriate nodes.

In an example, the influence-based caching mechanism 600 works as follows: the content demand predictor 605 observes the content requests and determines what content has the most benefit for caching, this information is passed to the diffusion network topology discoverer 610 to determine the path from publisher to subscriber, and the cost along the path. The node influence predictor 615 will determine the diffusion model. The caching influence scorer and selector 620 will take input from the node influence predictor 615 and the diffusion network topology discoverer 610 to rank nodes in order of optimality for caching content. The diffusion network topology discoverer 610 may rely on telemetry data collected from other nodes in the network to monitor resource utilization patterns occurring over various time periods. The diffusion network topology discoverer 610 may employ machine learning to analyze these patterns and to arrive at ranking scores that reflect expected resource utilization patterns. The selections are then transmitted to the cache system interface 625 to facilitate cache placement.

The influence-based cache mechanism 600 is a continuous process, that is, at every round the nodes make decisions about caching based on observation of the network. After a few rounds of observations and adjustment, the caching nodes (the nodes selected to cache a content) stabilizes. Initially, all nodes are cache targets, and as every node observes the demand, traffic, and diffusion network around it, the cache targets are adjusted to optimize which target nodes provide the greatest benefit to the network. The caching is made by the individual nodes based on partial observations of the network (e.g., direct neighbors) and predictions for the unobservable portions that may affect caching.

In addition to determining optimal placement of a data cache in the ICN, accounting for cache placement and access is a problem that faces ICN operators. ICNs consist of data producer and data consumer nodes facilitated by routing nodes. Routing nodes are expected to route and deliver interest and data packets on behalf of producer/consumer nodes. Routing nodes may cache data in local content stores facilitating improved performance when servicing requests from other consumers.

However, current ICN design expects routing nodes work for free or that the cost of routing node operations is shouldered by the network owner. In other words, a routing node has to spend/reserve its caching resources to keep X or Y content cached. But the routing nodes business model suggests they should "charge" the producer for helping to disseminate the producer's content. In a multi-owner and multi-vendor ICN ecosystem, both routing and consumer/producer nodes may be owned separately and may refuse to interact except in exchange for payment. Typically, there are interconnection agreements between operators. However, they are mainly to "route" packets from "source" to "destination."

Figure 7:
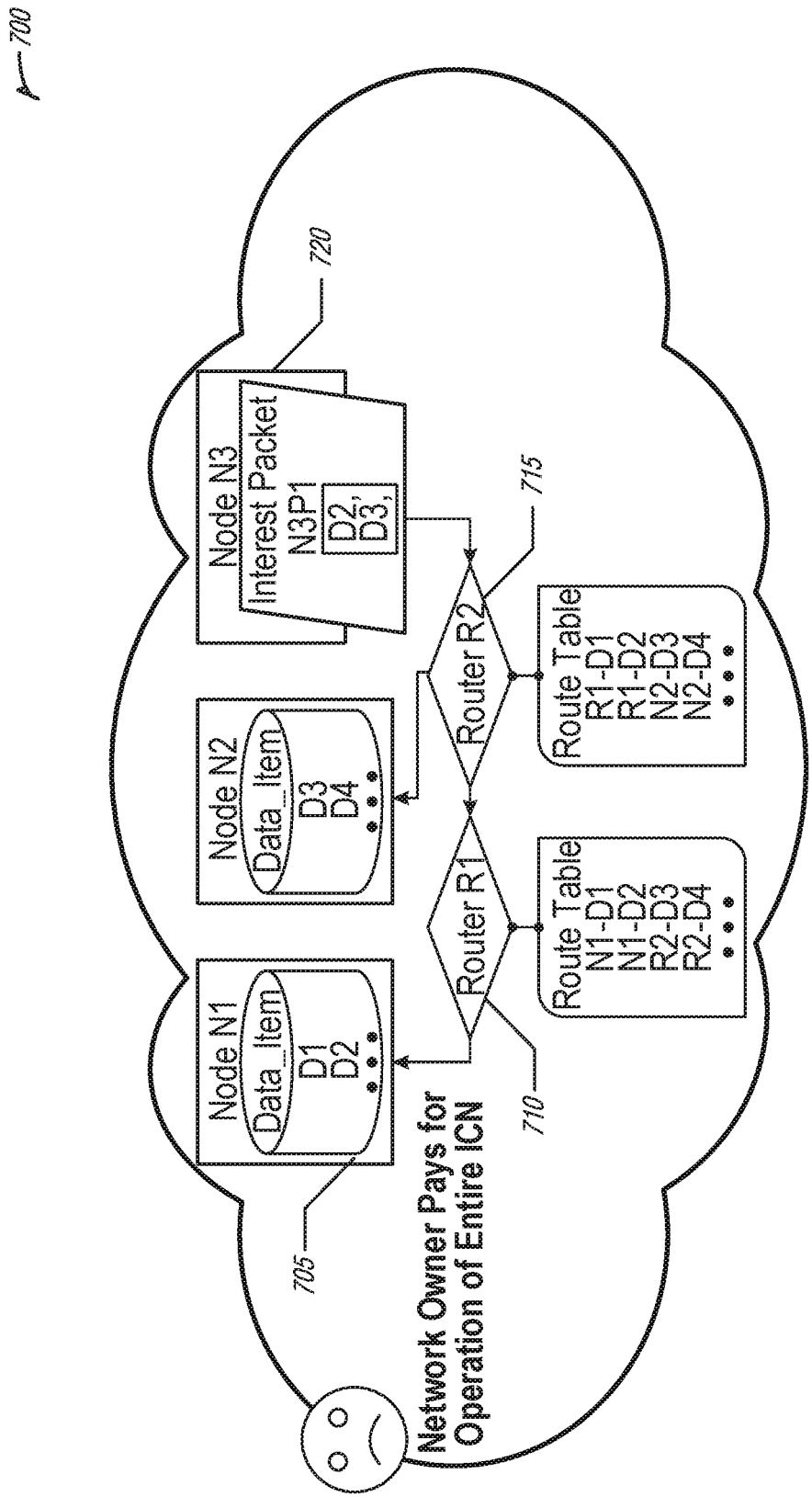
FIG. 7 illustrates an example of an environment in which an ICN owner bears the cost for operation of the ICN used by others, according to an embodiment.

FIG. 7 illustrates an example of an environment in which an ICN owner bears the cost for operation of the ICN 700 used by others, according to an embodiment. In an ICN context, in a case where the entire ICN 700 belongs to only one operator. Node 1 705 could be offering some content/service (e.g., third party such as NETFLIX®, etc.), the operator may cache the content in Router 1 710 and Router 2 715, such that when Node 3 720 is requesting a given content from "Netflix", it may be retrieved in a faster way from Router 2 715 instead of going all the way to Node 1 705. That is, the operator may help to reduce the computationally capabilities (e.g., storage, etc.) required in Node 1 705 and it should charge the owner of Node 1 705 (e.g., NETFLIX®) for that service because now, with ICN, it is not just "routing" packets but also helping to distribute/disseminate the content.

Distributed ledger technology relies on decentralized consensus algorithms that allow many nodes to agree on the state of transactions that are cataloged in a transaction log that is integrity protected using a cryptographic hash known as a blockchain. Transactions primarily involve transfer of a unit of e-currency called a "coin" or token. The blockchain ensures tokens are not double spent, forged, or forgotten. However, blockchains do not normally facilitate general purpose data exchange, and information management though blockchain transactions may contain some transaction data to provide context surrounding token exchange.

Blockchain technology is tuned for managing e-currency account transactions and not for delivering ICN data. ICNs are not tuned for managing e-currency or otherwise enabled with micro-payment technology that allows a rich ecosystem based on information exchange and information economy.

The systems and techniques discussed herein integrate distributed ledger capabilities with ICN routing nodes preforming routing functions, content caching, and accounting/metering in exchange for micro-payments in the form of blockchain e-currency. Routing nodes may cooperate in forwarding interest and data packets by compensating the handoff with an e-currency exchange. Producer and consumer nodes may compensate routing nodes in similar fashion. This creates a model for independent operation of routing nodes. It also creates a leveraged infrastructure that supports an end-to-end information economy where data producer nodes may receive e-currency payment from consumer nodes.

ICNs are enabled to function in an information market/economy where no single entity owns the ICN (and hence shoulders the cost of its operation). Each node may have a different owner and may set payment and service delivery terms according to the value of the information or service provided.

Figure 8:
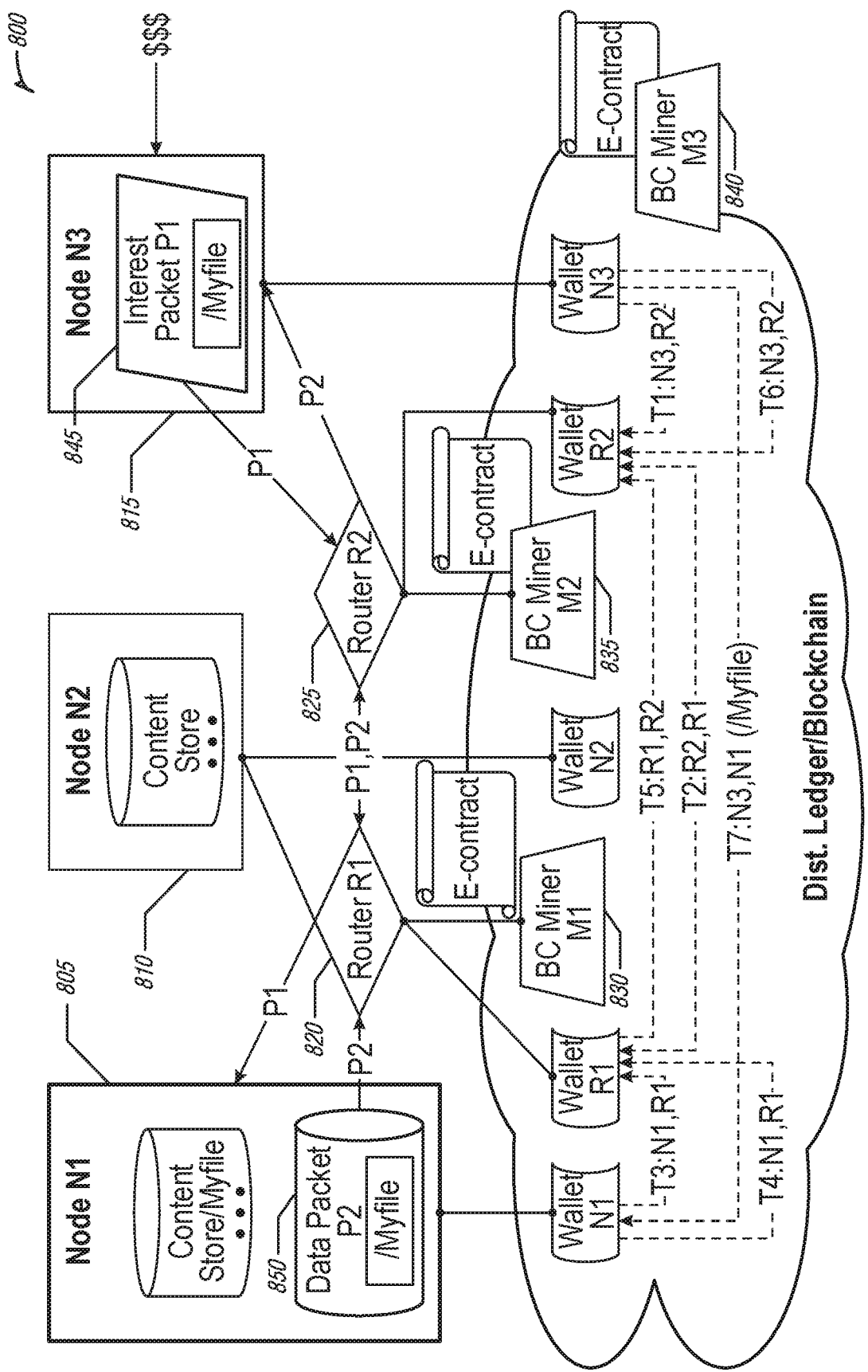
FIG. 8 illustrates an example of a system for blockchain-based cost recovery for information-centric network data cache management, according to an embodiment.

FIG. 8 illustrates an example of a system 800 for blockchain-based cost recovery for information-centric network data cache management, according to an embodiment. FIG. 8 shows, at a high level, a "pay-as-you-go" model for operating an ICN. In an example ICN consisting of three nodes (Node N1 805, Node N2 810, Node N3 815) and two routing nodes (Router R1 820 and Router R2 825). Routing nodes participate in a distributed ledger system (e.g., blockchain) using blockchain miners (BC Miner M1 830 and BC Miner M2 835). Miners process transactions of e-currency (e.g., "tokens") exchanged between wallets. Each node exposes a wallet to the blockchain. The blockchain may have additional mining nodes not connected to the ICN (e.g., BC Miner M3 840). Transactions are informed by e-contracts that direct miners to transfer a number of tokens in response to business logic conditions that are satisfied.

In an example, a content store of Node N2 810 may participate as a content caching node (not shown). A routing node may discover a more efficient path to the content found in content store used as a cache. Node N2 810 may be motivated to perform a content caching function in exchange for a portion of the e-currency. The routing node may be motivated to service content from a cache instead of going to the original producer in order to improve performance, but also to save money, as an e-contract or service level agreement (SLA) may compensate the routing node higher for delivering content sooner.

In another example, if there is more than one node (i.e., not just Node N3 815) requesting the same content, Router R2 825 may aggregate those interest packets and forward to Router R1 820 a single interest packet, and the E-contract may specify how payment will be facilitated through the wallets in this scenario. Moreover, if Node N3 815 requests data through Router R2 825 and data is successfully delivered to back to Node N3 815 from Router R2 825, Router R2 825 may cache a copy of the data for a period of time or based on resource availability (e.g., based on a caching policy, etc.). If another node is requesting that data, Router R2 825 may fulfill that request and send the data packet back. In this case, Router R2 825 may charge for caching and delivering that data, as long as those other nodes also have an E-contract with Router R2 825 and Node N1 805.

A scenario may be described as follows:

Node N3 815 may show interest in consuming a file named /myfile by constructing an interest packet P1 845 that is then delivered to a Router R2 825. Node N3 815 has a business relationship represented by an e-contract that authorizes payment to Router R2 825 for delivering interest packets.

Router R2 825 receives interest packet P1 845 and verifies it may find a route for interest packet P1 845. Under the terms of the contract, Router R2 825 authorizes its BC miner M2 835 to receive payment from Node N3 815 by transferring tokens from a wallet of Node N3 815 to a wallet of Router R2 825. The blockchain reaches consensus that the transaction T1:N3,R2 should be completed, where T1 is the transaction identifier, N3 is the source wallet (e.g., the wallet of Node N3 815), and R2 is the sink wallet (e.g., the wallet of Router R2 825).

Router R2 825 discovers a route to Router R1 820 for interest packet P1 845 and forwards it. The contract between Router R2 825 and Router R1 820 includes an agreement to compensate Router R1 820 for helping transmit interest packet P1 845 therefore the blockchain transaction T2:R2, R1 transfers tokens from the wallet of Router R2 825 wallet to a wallet of Router R1 820. In an example, there may be a routing algorithm in place. Routes may be known ahead of time and the decision to pick one route or another may depend on the quality of service (QoS) Node N3 815 is expecting that may be pre-negotiated via an SLA.

Router R1 820 finds a route to Node N1 805 and delivers interest packet P1 845. Upon receipt of interest packet P1 845, the contract between Node N1 805 and Router R1 820, for example, may require Node N1 805 to compensate Router R1 820 for delivering interest packets. The blockchain finalizes the transaction T3:N1,R1 resulting in the wallet for Router R1 820 receiving tokens from a wallet for Node N1 805.

Node N1 805 agrees to share /myfile with Node N3 815 and creates a data packet P2 850 containing /myfile. Node N1 805 may protect the content using encryption, DRM, or other techniques. Node N1 805 transmits data packet P2 850 to Router R1 820 following the route established by the interest packet P1 845. The contract between Node N1 805 and Router R1 820 may require, for example, payment for delivering data packets. A transaction, T4:N1,R1 is created resulting in tokens being moved from the wallet of Node N1 805 to the wallet of Router R1 820 in exchange for delivering data packet P2 850.

Router R1 820 delivers data packet P2 850 to Router R2 825. The blockchain applies the transaction T5:R1,R2 resulting in tokens moving from the wallet of Router R1 820 to the wallet of Router R2 825 in exchange for helping Router R1 820 deliver the data packet P2 850.

Router R2 825 delivers data packet P2 850 to Node N3 815. Node N3 815 agrees to compensate Router R2 825 for delivering the data packet P2 850 by applying the blockchain transaction T6:N3,R2. In an example, Router R2 825 may be compensated again for delivering content to Node N3 815 as an additional "payable" service.

Node N3 815 consumes the content/myfile. However, a condition of consumption may be that Node N3 815 must pay Node N1 805 for producing it. An additional transaction, T7:N3,N1, is committed to the blockchain resulting in tokens moving from the wallet of Node N3 815 to the wallet of Node N1 805.

Figure 9:
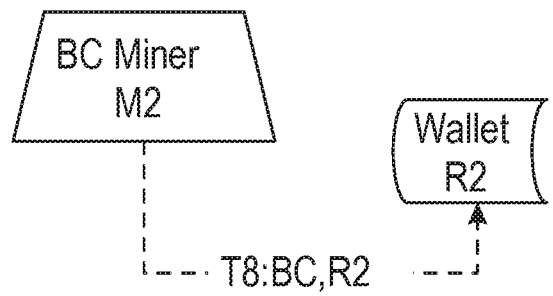
FIG. 9 illustrates an example of a router receiving tokens for establishing a miner node for information-centric network data cache management, according to an embodiment.

The rules directing how tokens move between wallets are based on contracts. Blockchain miners are able to parse contract details. A majority of miners must agree (e.g., interpret the contract the same way) before tokens are moved between wallets. Miners clear each transaction and agree upon the result. If one miner cheats and debits or credits the wrong amount to the wrong wallet, the other majority will disagree with the first. Authorization to apply the contract may rely on the wallet holder giving permission. This may involve using an authorization system such as PKI, Oauth2, TLS, passwords, etc. Blockchain miners may be compensated by the blockchain for processing and clearing transactions. Therefore, an additional transaction may be accounted for. In an example, the wallet of Router R2 825 may receive tokens from the blockchain in exchange for Router R2 825 standing up a miner node. FIG. 9 illustrates an example of a router receiving tokens for establishing a miner node for information-centric network data cache management, according to an embodiment.

Returning to the description of FIG. 8, the blockchain may have other miner nodes that are not part of the ICN, but who contribute to block construction and consensus (e.g., BC Miner M3 840, etc.). Each node (Node N1 805, Node N2 810, Node N3 815, Router R1 820, Router R2 825, etc.) may be owned/operated by different entities. Each entity receives compensation for work/service/content rendered.

In some examples, a node may not be compensated. For example, Node N3 815 may be presumed to gain value from external sources in exchange for consuming/myfile. For example, /myfile may contain advise for trading stocks, closing sales, etc. and may not be compensated further as the value of the content is considered to provide the compensation. In an example, the blockchain mechanism may also support sponsored ICN service. For example, Node N1 805 may be a service provider and Node N3 815 may be a mobile subscriber device accessing the content from the service provider. In this case, Node N1 805 may sponsor the transactions from both Router R1 820 and Router R2 825 based on a contract between the subscriber and the service provider. In this case, sponsored service needs to be indicated by Node N3 815 using a sponsorship indication mechanism such as naming of /myfile/sponsor/N3Credentials, a separate pending contract with Node N1 805, etc. The transactions with Router R1 820 and Router R2 825 may clear after Node N1 805 verifies Node N3 815 or a transaction with charging a wallet of Node N3 815 may be credited upon verification.

The size of content (data packets) may be larger than a single packet. For example, a video stream content may be fragmented into ICN maximum transmission unit (MTU) sized packets and delivered as multiple packets, potentially found among multiple content stores. There may be a per packet cost in terms of ICN e-contract policy or an SLA cost for delivering the large file (regardless of where fragmented packets may be stored and the related single-hop transportation costs).

Given an interest packet containing a request to perform a computation for well-known ICN-specific workloads (e.g. interest packet processing, etc.), it may be possible to extend the model to support general function execution under a named function networking (NFN). For example, the node performing the NFN may use blockchain to perform wallet transactions tied to the NFN function. Generalizing compute resources may involve different contracts for different compute resources (e.g., central processing unit (CPU), graphics processing unit (GPU), tensor processing unit (TPU), field programmable gate array (FPGA), etc.).

Caching considerations may add complexity where nodes under one node cache data also found on another node. Each cache hit could incur a blockchain transaction, such as according to a contract requirement. Router R2 825 and Router R1 820 may collude and selectively drop packets to keep the route intact and fool other nodes regarding which packets were actually processed. However, the blockchain history will reveal such collusion as flow discrepancies. Blockchain processing may be implemented in a hardened environment, such as a trusted execution environment, a virtualized environment, FPGA, etc.

Content may be organized into sponsored and unsponsored tiers. Each tier may have a different pricing model. For example, Node N3 815 may be provided with an option to choose content with or without ads (e.g., by indicating in a parameter of an interest packet, etc.). The producer may add advertisements as signed meta info to content. The intermediate routers may cache the content data and ad data separately. Depending on the interest packet parameter, data or data+ad may be returned from the cache. Ad-rich content may authorize an exchange of tokens from an advertiser's wallet, such as in exchange for presenting the ad to the user or to perform some other behavior beneficial to the advertiser.

Accounting and billing capabilities are common among information systems, social media, cloud computing, data streaming services and so forth. These involve use of traditional IP networks that are based on authenticated nodes, servers, and web services that require user accounts and contracts or SLAs tied to service agreements. Some existing techniques for including billing in ICN systems have been proposed. However, the traditional techniques may involve redesigning the existing ICN framework and may offer a limited feature set. For example, traditional accounting and billing mechanisms do not support ICNs and therefore are limited to performance and flexibility constraints associated with traditional (non-ICN) networks.

The systems and techniques discussed herein define a solution for exchanging value (e.g., monetary, informational, etc.) for ICN data as a condition of releasing ICN data packets to a receiving ICN node. An ICN interest packet may instruct a content store to present a data packet to the originator of the interest packet. Routers may transfer the data packet along the most efficient route possible. The systems and techniques discussed herein allow an interest packet to indicate a payment instrument such as an electronic contract, NFN, or meter that keeps track of data supplied to a requestor. Data owners may be able to deliver high value (e.g., more valuable, more useful, etc.) content using an ICN.

Figure 10:
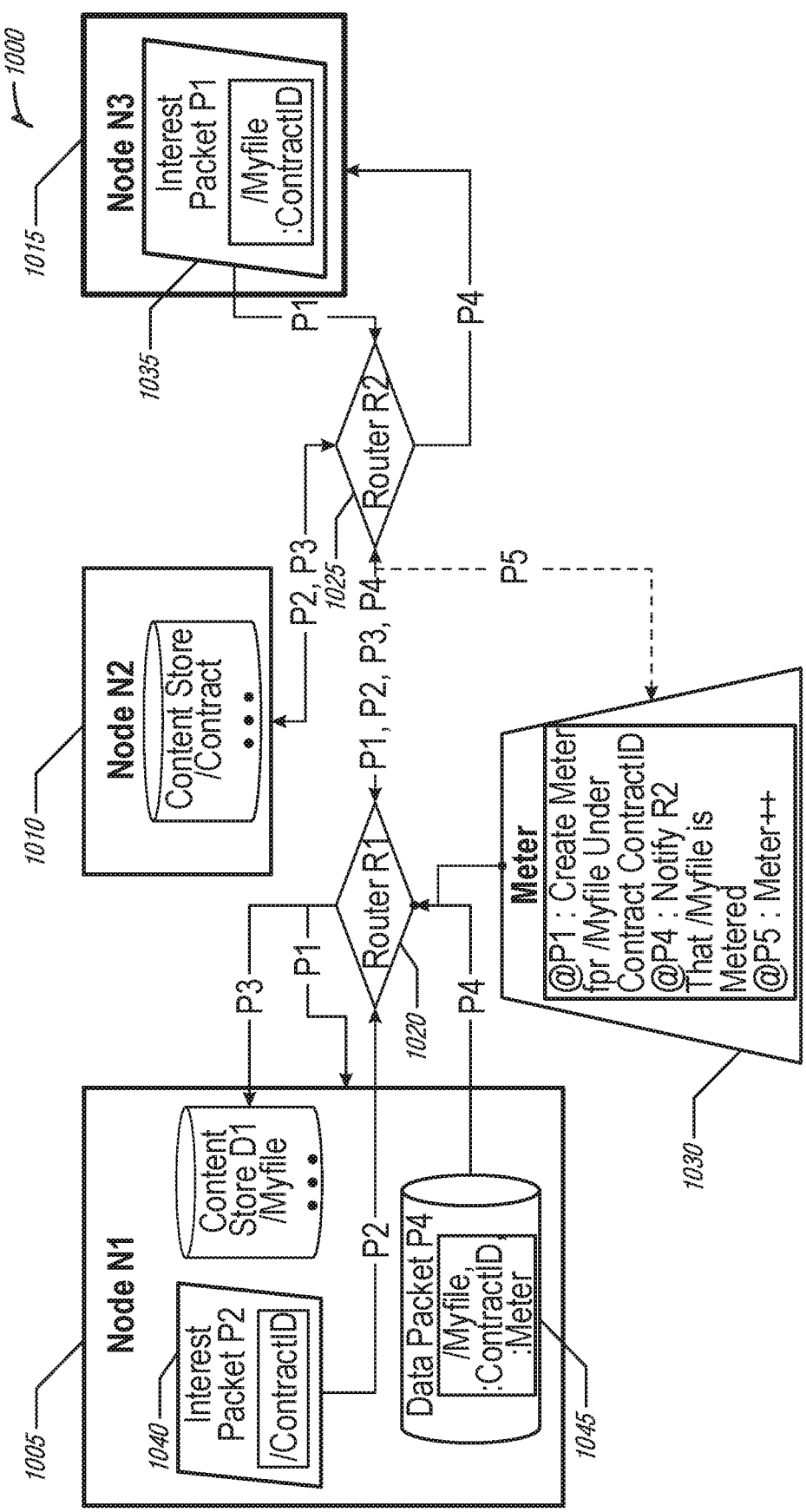
FIG. 10 illustrates an example of a system for content delivery metering for information-centric network data cache management, according to an embodiment.

FIG. 10 illustrates an example of a system 1000 for content delivery metering for information-centric network data cache management, according to an embodiment. The system 1000 includes an example ICN consisting of three nodes Node N1 1005, Node N2 1010, Node N3 1015 and two routers Router R1 1020, and Router R2 1025, where Router R1 820 has an additional role of metering delivered content for the ICN. A contract that defines the billing and payment agreement between Node N1 1005 and Node N3 1015 is stored on Node N2 1010. The contract may be digitally signed by a trusted third party or countersigned by Node N1 1005 and Node N3 1015 as evidence the two parties agree to the terms contained in the contract. Router R2 1025 is instrumented with logic for accounting content deliveries that are under contract and will notify the Metering 1030 capability in Router R1 1020 when data delivery is completed according to the contract. Meters may be used to inform a billing system to transfer funds according to a payment method of Node N3 10815 to Node N1 1005.

Additionally, nodes may be differentiated by role in terms of functions each performs beyond the Node N2 1010 and Router R1 1020 designation. For example, there may be some nodes pre-selected for specific roles such as metering nodes, content caching nodes, contract storing nodes, discovery node, etc. These role-specific nodes may be trusted as producer nodes as well as consumer nodes. There may be a discovery mechanism for neighboring nodes that allows them to know about the roles played by role-specific nodes. Even the routing may ensure, for example, that interest packets and content may need to go through certain role-specific nodes. Each producer node may rely on a different set of nodes that satisfies important roles. For example, a discovery role may be hosted by several nodes strategically positioned through the ICN to ensure timely response regardless of actual network topology (which should be hidden given an ICN abstraction). Discovery roles may be hosted by different ICN nodes in different parts of the actual network topology.

In an example, the system 1000 may operate as follows: Node N3 1015 constructs an interest packet P1 1035 containing the file of interest /myfile and includes a reference to the contract that authorizes appropriate payment called :ContractID. :ContractID references/Contract file that exist as another file in the ICN. :ContractID may be encoded in interest packets by using a "parameters" element that is common to most ICNs.

In this example, the contract is assumed to already be in place (e.g., pre-negotiated, etc.). In another example, "on-demand" contract negotiations may be facilitated where an interest packet arrives for a file that is not associated with an existing contract (e.g., /myfile2 (not shown)) but where the content producer has indicated the content is only delivered under contract. The routers may facilitate on-demand contract negotiation by delivering a data packet containing a contract file (e.g., /contract_myfile2) instead of /myfile2. The consumer node may then evaluate and accept, deny, or counter-offer. The consumer my resend an interest packet containing the proposed e-contract as part of the interest parameters. The producer node, may accept, deny, or counter-offer when returning the data packet. The negotiation may continue until a contract is accepted by both entities or refused by one or the other. For example, a final refusal parameter may accompany the response to the counter-offer indicating no further counter-offers will be considered. The routing nodes may enforce refusal of counter offers by inspecting the parameters field and prevent packet delivery if a counter-offer packet is again detected on the return path.

Returning to the example operation of system 1000, Node N3 1015 sends interest packet P1 1035 to Router R2 1025 that routes interest packet P1 1035 to Router R1 1020.

Router R1 1020 observes the interest packet P1 1035 is requesting potentially metered data. As the metering 1030 service host, Router R1 1020 creates a meter resource for /myfile and associates /ContractID with it. Router R1 1020 then routes interest packet P1 1035 to Node N1 1005.

Upon receipt of the interest packet P1 1035, Node N1 1005 recognizes the interest packet P1 1035 request is for metered content under the contract identified by :contractID. Node N1 1005 creates an interest packet P2 1040 for /ContractID and sends it to Router R1 1020. In an example, the :contractID /myfile meter could be part of the naming to facilitate routing and encryption.

Router R1 1020 routes interest packet P2 1040 to Router R2 1025. Router R2 1025 routes the interest packet P2 1040 to Node N2 1010. In an example, Node N2 1010 may be more than one hop from Router R2 1025. In the example, Router R2 1025 is aware that Node N2 1010 has the correct specific-role to assist in facilitating delivery.

Node N2 1010 returns a data packet P3 containing /Contract file to Node N1 1005 (through Router R2 1025 and Router R1 1020).

Node N1 1005 reviews the terms of the contract authorizing disclosure of /myfile to Node N3 1015. Node N1 1005 may take steps to ensure only Node N3 1015 is able to access the content using a variety of techniques such as encryption, etc. In an example, ICNs may anticipate methods for providing end-to-end content encryption. In an example, the binding of the contract, meter, and content together may involve digital signatures over data or interest packets.

Node N1 1005 constructs a metered data packet P4 1045 containing /myfile, :ContractID and :Meter. Meter is a reference to the meter resource 1030 on Router R1 1020 that was created for /myfile. Content (e.g. /myfile) may be larger than a single data packet, implying there could be multiple data packets returned following acceptance of an interest packet (e.g., metered data packet P4 1045=[p0, p1, . . . , pn], where n is the number of fragments.). In ICN, the data packet follows the interest packet's reverse route. In an example, the metering node may create a resource for metering /myfile. In a case where there are more than one metering node, Router R1 1020 may add the :Meter parameter to the interest packet so that other metering nodes understand that Router R1 1020 will be responsible for metering. The :meter parameter may also be part of the contract so that Node N2 1010 may include it in the contract packet. At that point, Router R1 1020 may create a resource for /myfile.

Node N1 1005 sends metered data packet P4 1045 to Router R1 1020 for delivery to Node N3 1015 through Router R2 1025.

Router R1 1020 observes metered data packet P4 1045 contains a reference to metered data and notifies Router R2 1025 that Router R1 1020 is the metering host for /myfile. This may be accomplished by including the metering 1030 host Router R1 1020 in the data packet metadata element (e.g. :Meter@R1). It may be necessary to separate signed from signed-and-encrypted metadata so that router nodes may view the metering metadata. If a routing node supplies the metadata element in the context of exchanging an information or data packet, the packet metadata structure may support counter-signing where multiple signatures may be applied. RFC8292 is an example of a manifest structure that may be used to implement elements of an ICN packet. In an example, multiple nodes may keep its resource on wait/reserved for metering and free the resource.

In an example, the billing data may have a separate field in the interest/data packet where the original sender of the interest packet inserts the details of the billing mechanism or contract in the interest packet. When the packet hits a billing router, it makes a note in the PIT that this packet needs to be counted or billed, removes the field, and then forwards the packet. If the interest packet reaches the publisher and the billing field has not been removed, then the publisher performs the billing for that packet.

In an example, the data may be one hop away or very close such that there are no billing routers in the path of the packet. This scenario is handled according to contract terms.

For example, the contract may state that it is permissible to forward the data without billing for that packet if there are no billing routers. In another example, if a node has the data in its content store, but does not have the ability to bill for it, it just forwards the interest packet so it may reach a billing router.

Returning to the operation of system 1000, Router R2 1025 receives metered data packet P4 1045, observes :Meter@R1 is metering /myfile, and sets an internal state variable that triggers when metered data packet P4 1045 is delivered to Node N3 1015.

Router R2 1025 delivers metered data packet P4 1045 to Node N3 1015 and triggers sending a notification P5 to Router R1 1025 indicating/myfile was delivered to Node N3 1015. In an example, Router R1 1020 and Router R2 1025 may use a highly reliable control network interface for sending P5 notifications.

Router R1 1020 increments the meter resource 1030. A billing application periodically reads the meter 1030 for /myfile and consults the contract to determine payment steps. Upon completion of payment the meter may be reset or another state variable may be used to record the meter value where payment has been settled. In an example, the contract may describe a variety of payment methods. In another example, meters may have multiple forms of meters (e.g., number of time file is delivered, number of bytes delivered, bandwidth utilization associated with content delivery, etc. In an example, metering telemetry data may be collected for analytics purposes instead of or in addition to being collected for billing purposes.

In an example, commonly used operational exchanges such as discovery, contract negotiation, etc. where much or all of the interactions are achievable at an ICN application layer may be encapsulated as re-usable 'scripts' that may be made available broadly in the ICN for the benefit of the ICN community. For example, script files (e.g., /ISN_script1) may be generally available in the ICN and obtained using the ICN primitives for interest/data packet exchange. In this way, the ICN may bootstrap itself into a more sophisticated developer and user environment.

In an example, if there is more than one node (e.g., not just Node N3 1015) requesting the same content, Router R2 1025 may aggregate the interest packets and forward to Router R1 1020 a single interest packet and the E-contract may specify how this to handle the metering and billing. Moreover, if Node N3 1015 requests data through Router R2 1025 and the data is successfully delivery to back to Node N3 1015 from Router R2 1025, Router R2 1025 may cache a copy of the data for some period of time or based on resource availability (e.g., based on a caching policy, etc.) and if another node is requesting that data, Router R2 1025 may fulfill that request and send the data packet back. In this case, Router R2 1025 may charge for caching and delivering that data, as long as the other nodes also have an E-contract with Router R2 1025 and Node N1 1005.

In some scenarios it may take a user-noticeable delay (e.g., several seconds, etc.) between sending interest packet to fetch some content and get the content delivered. These requests for content may be originated around some specific area, for example, an entrance of a mall, a bus stop, a train station, etc. Proactive and context-aware caching may reduce latency, avoiding flooding the network with interest packets (e.g., causing congestion, etc.), and improving the user experience.

Content caching may be performed in the application layer for some services, such as for NETFLIX®. Application layer caching requires the full end-to-end stacks on the intermediate nodes. More memory, processing power, and power may be required at the intermediate nodes.

In a network, content generators and consumers are present. The content generators are distributed across the network. Most of the content consumers send their request to certain nodes in the network. Those nodes use context awareness features to learn about how many interest packets are received for a certain content or for a certain category of contents within a time frame. These nodes proactively cache those content for faster delivery. The content generators keep track of the nodes that are doing proactive caching. Whenever they generate or update their content, they forward the content to the nodes that were doing proactive caching based on the popularity category, popularity, or interest score. This may avoid flooding the network with interest packets and may reduce latency, resulting in a better user experience.

Figure 11:
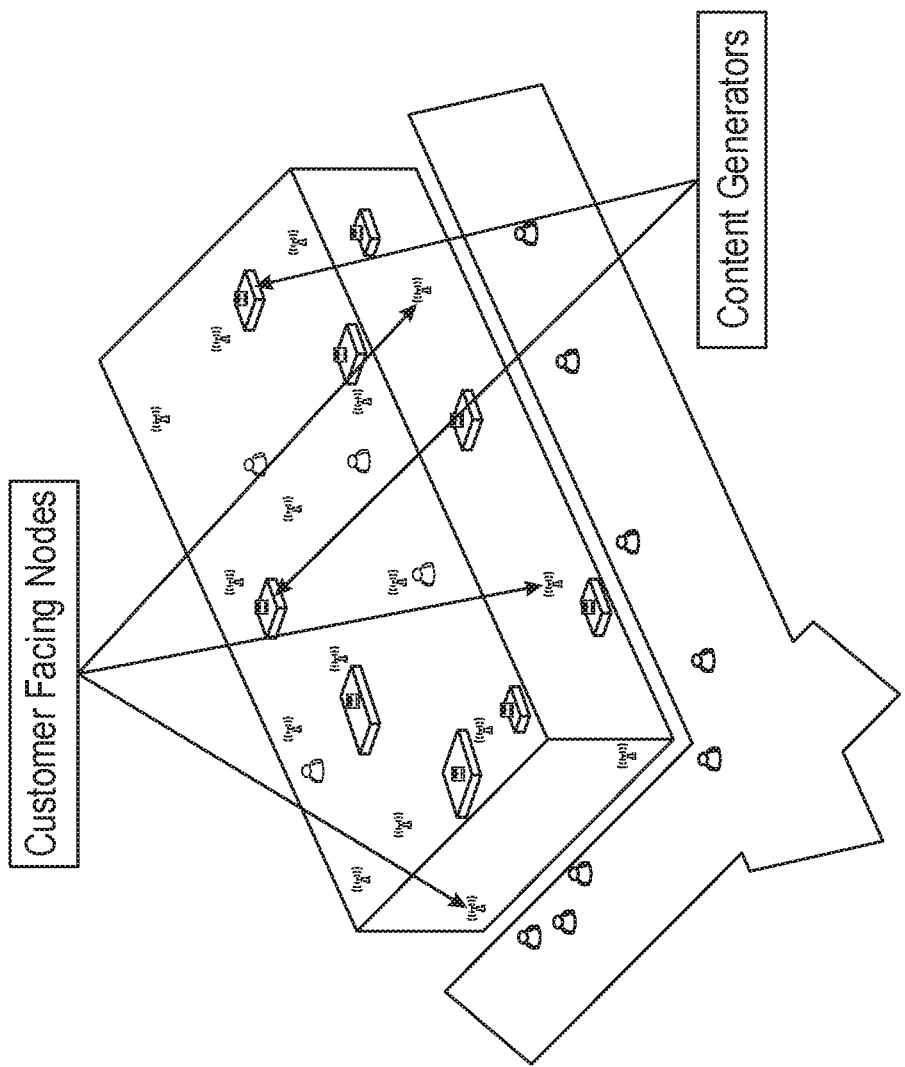
FIG. 11 illustrates an example of an environment including content generator nodes (CGN) and customer facing nodes (CFN) for information-centric network data cache management, according to an embodiment.

FIG. 11 illustrates an example of an environment 1100 including content generator nodes (CGN) and customer facing nodes (CFN) for information-centric network data cache management, according to an embodiment. The CGNs are distributed randomly across the network. The CFNs are located at some specific areas. A CFN has the following: 1. Content store (CS) for caching data packets, 2. Forwarding information base (FIB) for storing outgoing interfaces to forward interest packets, and 3. Pending interest table (PIT) for keeping track of forwarded interest packets for the content not readily available in CS.

The CFN checks the PIT log over a period of time (e.g., once a day), and collects the type of interest packets received in that period of time. It gives interest score for each type of the interest packets proportional to the number of interest packet types received. Different interest score calculation algorithms based on additional attributes could also be used, for example, based on reinforcement learning, metering telemetry information, etc.

Based on the ranking of the scores, a CFN proactively requests the content of a popularity category from the content generator and caches the content in the CS. The CFN may use pull-based ICN techniques to request the content. The CFN may embed its identity/address/name and some additional parameters, such as updated popularity score of the requested content in the interest packet it sends, to fetch the content. In an example, a CGN may stop proactively sending the content if the popularity score goes below some threshold.

In an example, the CFN may indicate a CGN to send the requested content or the similar content generated at the CGN periodically by indicating so in the interest packet. That is the CFN may initiate a periodic push of content from the CGN to the CFN. The intermediate routers may consider such interest as 'long-lived interest' where a PIT is maintained at intermediate routers for a duration longer than the specified period. A special interest packet may be sent from the CFN to the CGN frequently or periodically to indicate an updated popularity score or stop the periodic push of content. The special interest packet may be sent as a response from the CFN after each content push from the CGN. In an example, the CGN may push the content any time before the periodicity. For example, if a new content in the same category is available at the CGN, The CGN may push it to the CFN immediately. Since intermediate routers maintain a long-lived interest packet for a duration longer than specified period, the content reaches the CFN.

The CGN collects the queries over a period of time and identifies the interested CFNs for various categories of content and maintains their identities/addresses/names.

Whenever the CGN updates the content that the CFNs requested before, or the CGN generates a new content in that category, it proactively forwards the updated content to those CFNs using a push-based mechanism. If the above-mentioned long-lived interest packet is not maintained at an intermediate router, the CGN searches for a new route to the CFN(s) before sending updated or new content. For this purpose, the CGN may send a special interest packet as a route discovery request packet with the info of the CFN and info of the content in the interest packet. After the CFN receives the route discovery packet, it sends a route discovery response packet (with content info from route discovery request packet) towards the CGN. The route discovery response packet is used by intermediate routers to confirm the route and to add PIT entries at intermediate routers for expected content delivery from the CGN to the CFN. That is, route discovery response is interest for the content (content specified in route discovery request packet). In an example, this technique may be used for large-sized content. In another example, for small-sized content, the CGN may send content as a part of a name in the interest packet. After receipt of the interest packet, the CFN may send dummy data as acknowledgement (ACK) to the CGN. This dummy response helps intermediate routers to clear associated PIT entries.

In an example, the CFN may need to proactively cache content that belongs to a different CGN, but they may belong to the same interest packet type. For example, the interest packet type may be "food" but different food vendors (e.g., different CGNs) may have different food types (e.g., content). In this scenario the CFN may pre-process (e.g., merge, stitch, combine, etc.) these same types of content and cache them together.

In an example, content generated by the CGN may come with a lifespan-of-information. When the lifespan-of-information expires (e.g., a limited time deal for food, clothes, etc.) the CFN may request updated content from CGN.

In an example, metering telemetry may be used to inform popularity or reputation. ICN packet flows may collect telemetry data on a per content item basis (e.g., /myfile). Telemetry metering increments the meter for each hop involved in a round trip event (consumer to producer with interest packet followed by producer to consumer with data packet). A popularity or reputation score associated with ICN content is useful where multiple users may wish to share positive/negative user experiences associated with ICN data that they have interacted with.

Given an ICN that supports metering/telemetry gathering (e.g., as described in FIG. 10), a reputation system may be implemented in the following way: 1) At the conclusion of a metered round-trip the metering node normally may retain meters until a billing service collects the meter values and deletes them. When reputation for an ICN data item (e.g. /myfile) is performed. The metering node updates an ICN data item tasked with maintaining a reputation score (e.g. /myfile_reputation_score) at the conclusion of the round trip. 2) Reputation updates may count round trips rather than hops or other less relevant telemetry context. Reputation tallying also tracks which node completed the round trip. If/myfile was consumed by N1, N2 and N3. And N1 completed 3 round trips, N2 two round trips and N3 one round trip. The reputation file (/myfile_reputation_score) would contain: N1:3, N2:2, N3:1. 3) The node hosting /myfile_reputation_score computes a "star" rating by taking the average of the number of round trips completed divided by the total number of nodes in the network (e.g. if there are 10 nodes in the ICN, then A=Average(6, 10)=0.6), then taking the ratio relative to the number of stars in the star index. For example, if using a 5-star average rating system, the average is then 60% of 5, or 3 stars. 4) The star rating may be exposed to the ICN by placing it in a read-only section of /myfile_reputation_score. For example, an IETF RFC8152 (https://datatracker.ietf.org/doc/rfc8152/) manifest structure may be used to hold an encrypted part and an integrity protected, but cleartext part. 5) Reputation collection nodes such as routing nodes may be trusted to update the reputation file's encrypted part by encrypting it with a group encryption key. This could be a shared symmetric key or an RSA public key. The encryption key is authenticated using an asymmetric signing key such as an ECDSA or EPID group signing key. If using an ECDSA key, the node hosting the reputation file (e.g. /myfile_reputation_score) may maintain an ECDSA public key for each routing node. If EPID key is used the hosting node may only need to maintain a single EPID public key.

Figure 12:
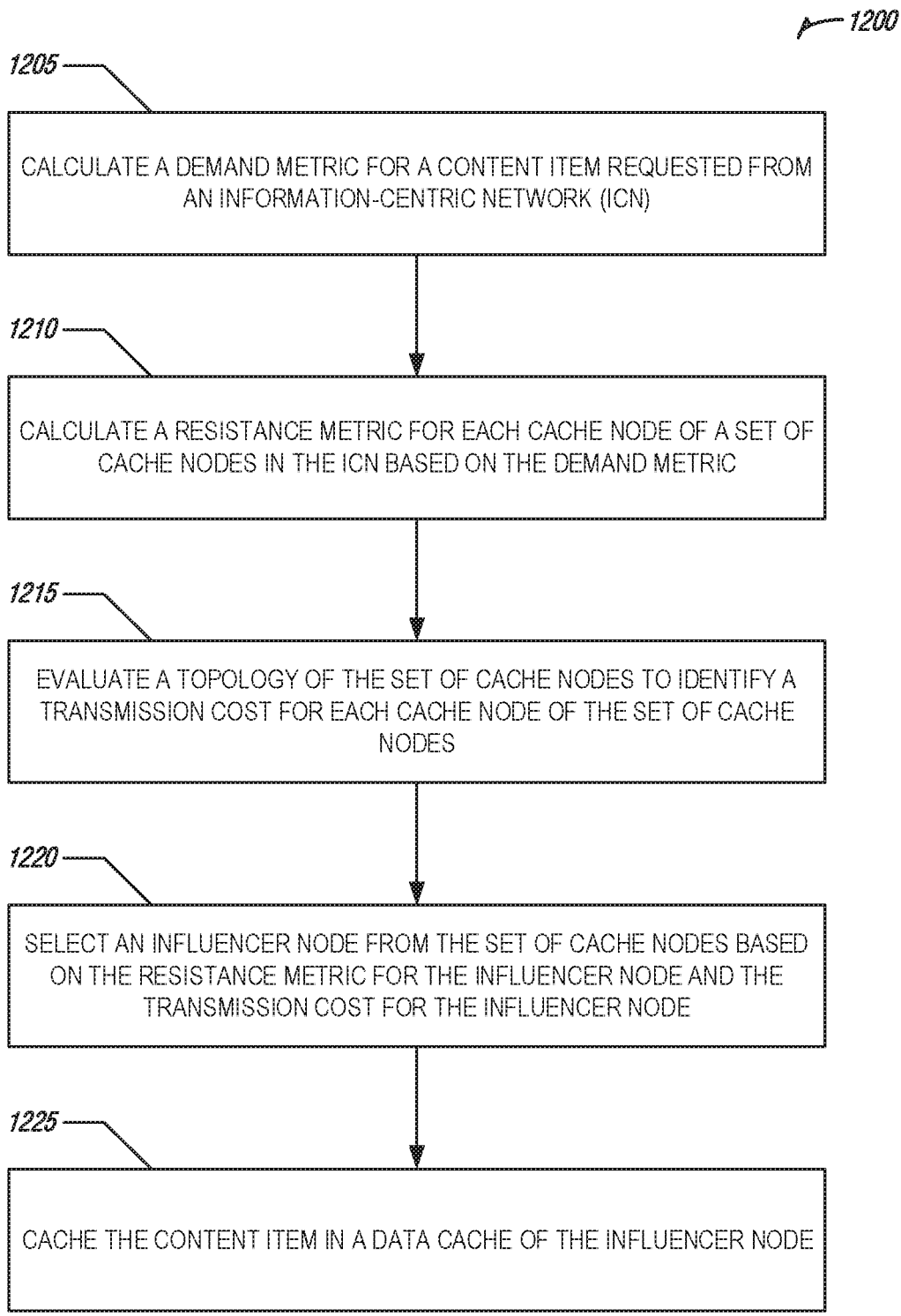
FIG. 12 is a flow diagram of an example of a method for information-centric network data cache management, according to an embodiment.

FIG. 12 is a flow diagram of an example of a method 1200 for information-centric network data cache management, according to an embodiment. The method 1200 may provide features as described in FIGS. 1-11.

A demand metric may be calculated for a content item requested from an information-centric network (ICN) (e.g., at operation 1205). The demand metric may indicate an expected proliferation of the content item throughout the ICN. For example, it may be determined that a content item is being consumed by a variety of nodes and the demand metric may include a consumption velocity of the content item. For example, a number of consumer nodes may be requesting content items relating to a new cell phone model and a demand metric may be created for an image of the new cell phone model based on a growing (or sustained) quantity of requests for the image. In an example, the demand metric is calculated in part using a request velocity for the content item.

A resistance metric may be calculated for each node of a set of cache nodes in the ICN based on the demand metric (e.g., at operation 1210). The resistance metric may indicate an ability of each cache node of the set of cache nodes to cache the content item. In an example, the resistance metric is calculated in part using a data output velocity of a respective cache node.

A topology of the set of cache nodes may be evaluated to identify a transmission cost for each cache node of the set of cache nodes (e.g., at operation 1215). The transmission cost may indicate an average cost of transmitting the content between each cache node of the set of cache nodes and a set of content requester nodes.

An influencer node may be selected from the set of cache nodes based on the resistance metric for the influencer node and the transmission cost for the influencer node (e.g., at operation 1220). The content item may be cached in a data cache of the influencer node (e.g., at operation 1225).

In an example, a node cache capacity may be determined for each cache node of the set of cache nodes. A node computation capacity may be determined for each node of the set of cache nodes. An available bandwidth may be determined for each node of the set of cache nodes. An influencer score may be calculated for each node of the set of cache nodes using the node cache capacity, node computation capacity, and available bandwidth. The influencer node may be selected in part based on the influencer score for the influencer node.

In an example, an interest packet that includes identification of the content item may be received by a first router node from a consumer node. A path to the influencer node may be determined. A first e-contract may be identified for the first router node. In an example, the first e-contract specifying a set of rules for providing tokens to the first router node in exchange for delivery of content. A first quantity of tokens may be transferred from a consumer node digital wallet of the consumer node to a first router node digital wallet of the first router node based on the set of rules included in the first e-contract. In an example, the first quantity of tokens is transferred by a miner node. A first transaction record may be recorded to a blockchain that reflects the first quantity of tokens and the content item may be transmitted from the influencer node to the consumer node via the first router node. In an example, the content item is encrypted by the first router node before transmission to the consumer node. In an example, a second quantity of tokens may be transferred from the influencer node to the first router based on the first e-contract and a second transaction record may be recorded to the blockchain that reflects the second quantity of tokens.

In an example, an interest packet may be received for the content item from a consumer node. A contract may be identified that is included in the interest packet. In an example, the contract may specify payment terms for the content item. A meter resource may be generated for the content item based on the contract. A data packet may be transmitted to the influencer node including a reference to the meter resource. The content may be transmitted to the consumer node in a content data packet that includes the reference to the meter resource, and billing data may be generated for the content to be delivered to the consumer node based on a path traversed by the content between the influencer node and the consumer node. In an example, the path may be indicated based on packet exchanges between nodes that include the reference to the meter resource. In an example, the content item is encrypted by the influencer node. In an example, the payment terms for the content item are negotiated between the consumer node and the influencer node before transmission of the content item.

In an example, a content category may be identified for the content item. A popularity score may be calculated for the content item category based on a number of content items requested within the ICN that are associated with the content category. In an example, the popularity score is calculated in part based on an evaluation of pending interest table data from nodes on the ICN. The content item may be selected for caching at the influencer node based on the content category associated with the content item and the popularity score of the content item category. In an example, the content item is selected in part based on the ranking score for the content item category being higher than a popularity score for another content item category. In an example, a reputation score may be calculated for the content item and the selection of the content item may include using the reputation score. In an example, the reputation score is calculated based on a number of round trips for the content item on the ICN divided by a number of nodes on the ICN. In an example, a second content item may be identified that is associated with the content category and the second content item may be cached at the influencer node based on the association between the second content item and the popularity score of the content item category.

Figure 13:
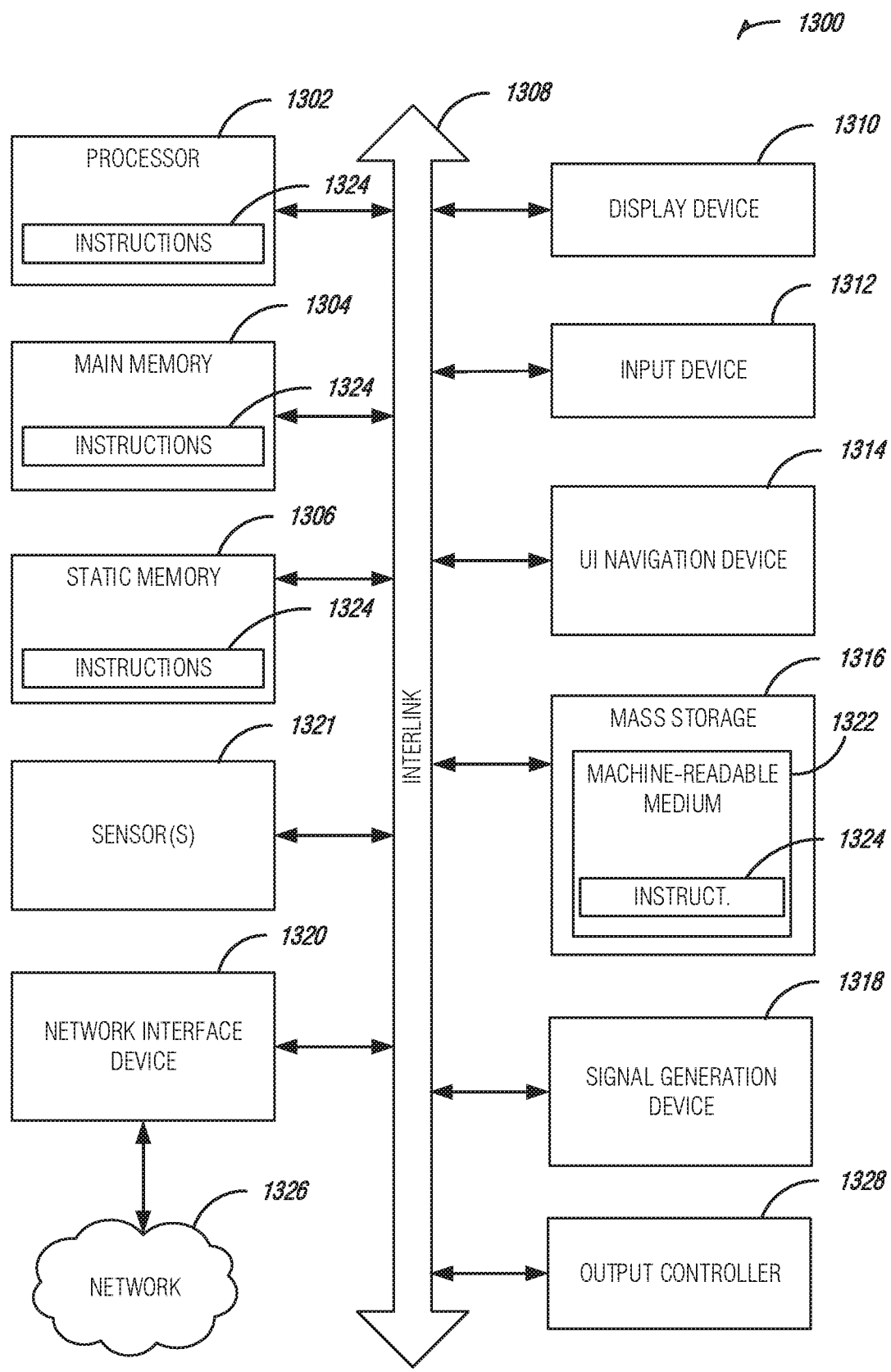
FIG. 13 is a block diagram illustrating an example of a machine upon which one or more embodiments may be implemented.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensors. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

ADDITIONAL NOTES & EXAMPLES

Example 1 is a method for information-centric network data cache management, the method comprising: calculating a demand metric for a content item requested from an information-centric network (ICN), the demand metric indicating an expected proliferation of the content item throughout the ICN; calculating, based on the demand metric, a resistance metric for each cache node of a set of cache nodes in the ICN, the resistance metric indicating an ability of each cache node of the set of cache nodes to cache the content item; evaluating a topology of the set of cache nodes to identify a transmission cost for each cache node of the set of cache nodes, the transmission cost indicating an average cost of transmitting the content between each cache node of the set of cache nodes and a set of content requester nodes; selecting an influencer node from the set of cache nodes based on the resistance metric for the influencer node and the transmission cost for the influencer node; and caching the content item in a data cache of the influencer node.

In Example 2, the subject matter of Example 1 includes, wherein the demand metric is calculated in part using a request velocity for the content item.

In Example 3, the subject matter of Examples 1-2 includes, wherein the resistance metric is calculated in part using a data output velocity of a respective cache node.

In Example 4, the subject matter of Examples 1-3 includes, determining a node cache capacity for each cache node of the set of cache nodes; determining a node computation capacity for each node of the set of cache nodes; determining an available bandwidth for each node of the set of cache nodes; and calculating an influencer score for each node of the set of cache nodes using the node cache capacity, node computation capacity, and available bandwidth, wherein selecting the influencer node is based in part on the influencer score for the influencer node.

In Example 5, the subject matter of Examples 1-4 includes, receiving, by a first router node, an interest packet including identification of the content item from a consumer node; determining a path to the influencer node; identifying a first e-contract for the first router node, the first e-contract specifying a set of rules for providing tokens to the first router node in exchange for delivery of content; transferring a first quantity of tokens from a consumer node digital wallet of the consumer node to a first router node digital wallet of the first router node based on the set of rules included in the first e-contract; recording a first transaction record reflecting the first quantity of tokens to a blockchain; and transmitting the content item from the influencer node to the consumer node via the first router node.

In Example 6, the subject matter of Example 5 includes, transferring a second quantity of tokens from the influencer node to the first router based on the first e-contract and recording a second transaction record reflecting the second quantity of tokens to the blockchain.

In Example 7, the subject matter of Examples 5-6 includes, identifying a second e-contract for the influencer node, the second e-contract specifying a set of rules for providing tokens to the influencer node in exchange for delivery of content; transferring a third quantity of tokens from the consumer node digital wallet of the consumer node to an influencer node digital wallet of the influencer node based on the set of rules included in the second e-contract; recording a third transaction record reflecting the third quantity of tokens to the blockchain; and transmitting the content item from the influencer node to the first router node.

In Example 8, the subject matter of Examples 5-7 includes, wherein the first quantity of tokens is transferred by a miner node.

In Example 9, the subject matter of Examples 5-8 includes, wherein the content item is encrypted by the first router node before transmission to the consumer node.

In Example 10, the subject matter of Examples 1-9 includes, receiving an interest packet for the content item from a consumer node; identifying a contract included in the interest packet, the contract specifying payment terms for the content item; generating a meter resource for the content item based on the contract; transmitting a data packet to the influencer node including a reference to the meter resource; transmitting the content to the consumer node in a content data packet that includes the reference to the meter resource; and generating billing data for the content to be delivered to the consumer node based on a path traversed by the content between the influencer node and the consumer node, the path indicated based on packet exchanges between nodes that include the reference to the meter resource.

In Example 11, the subject matter of Example 10 includes, wherein the content item is encrypted by the influencer node.

In Example 12, the subject matter of Examples 10-11 includes, wherein the payment terms for the content item are negotiated between the consumer node and the influencer node before transmission of the content item.

In Example 13, the subject matter of Examples 1-12 includes, identifying a content category for the content item; calculating a popularity score for the content item category based on a number of content items requested within the ICN that are associated with the content category; and selecting the content item for caching at the influencer node based on the content category associated with the content item and the popularity score of the content item category.

In Example 14, the subject matter of Example 13 includes, wherein the popularity score is calculated in part based on an evaluation of pending interest table data from nodes on the ICN.

In Example 15, the subject matter of Examples 13-14 includes, wherein the content item is selected in part based on the popularity score for the content item category being higher than a popularity score for another content item category.

In Example 16, the subject matter of Examples 13-15 includes, calculating a reputation score for the content item, wherein selection of the content item includes using the reputation score.

In Example 17, the subject matter of Example 16 includes, wherein the reputation score is calculated based on a number of round trips for the content item on the ICN divided by a number of nodes on the ICN.

In Example 18, the subject matter of Examples 13-17 includes, identifying a second content item associated with the content category; and caching the second content item at the influencer node based on the association between the second content item and the popularity score of the content item category.

Example 19 is a system to implement information-centric network data cache management, the system comprising means to perform any method of Examples 1-18.

Example 20 is at least one machine-readable medium to implement information-centric network data cache management, the at least one machine readable medium including instructions that, when executed by a machine, cause the machine to perform any method of Examples 1-18.

Example 21 is a system for information-centric network data cache management, the system comprising: at least one processor; and memory including instructions that, when executed by the at least one processor, cause the at least one processor to perform operations to: calculate a demand metric for a content item requested from an information-centric network (ICN), wherein the demand metric indicates an expected proliferation of the content item throughout the ICN; calculate, based on the demand metric, a resistance metric for each cache node of a set of cache nodes in the ICN, wherein the resistance metric indicates an ability of each cache node of the set of cache nodes to cache the content item; evaluate a topology of the set of cache nodes to identify a transmission cost for each cache node of the set of cache nodes, wherein the transmission cost indicates an average cost of transmission of the content between each cache node of the set of cache nodes and a set of content requester nodes; select an influencer node from the set of cache nodes based on the resistance metric for the influencer node and the transmission cost for the influencer node; and cache the content item in a data cache of the influencer node.

In Example 22, the subject matter of Example 21 includes, wherein the demand metric is calculated in part using a request velocity for the content item.

In Example 23, the subject matter of Examples 21-22 includes, wherein the resistance metric is calculated in part using a data output velocity of a respective cache node.

In Example 24, the subject matter of Examples 21-23 includes, instructions that cause the at least one processor to: determine a node cache capacity for each cache node of the set of cache nodes; determine a node computation capacity for each node of the set of cache nodes; determine an available bandwidth for each node of the set of cache nodes; and calculate an influencer score for each node of the set of cache nodes using the node cache capacity, node computation capacity, and available bandwidth, wherein the selection of the influencer node is based in part on the influencer score for the influencer node.

In Example 25, the subject matter of Examples 21-24 includes, instructions that cause the at least one processor to: receive, by a first router node, an interest packet that includes identification of the content item from a consumer node; determine a path to the influencer node; identify a first e-contract for the first router node, wherein the first e-contract specifies a set of rules to provided tokens to the first router node in exchange for delivery of content transfer a first quantity of tokens from a consumer node digital wallet of the consumer node to a first router node digital wallet of the first router node based on the set of rules included in the first e-contract; record a first transaction record that reflects the first quantity of tokens to a blockchain; and transmit the content item from the influencer node to the consumer node via the first router node.

In Example 26, the subject matter of Example 25 includes, instructions that cause the at least one processor to transfer a second quantity of tokens from the influencer node to the first router based on the first e-contract and record a second transaction record that reflects the second quantity of tokens to the blockchain.

In Example 27, the subject matter of Examples 25-26 includes, instructions that cause the at least one processor to: identify a second e-contract for the influencer node, wherein the second e-contract specifies a set of rules to provide tokens to the influencer node in exchange for delivery of content; transfer a third quantity of tokens from the consumer node digital wallet of the consumer node to an influencer node digital wallet of the influencer node based on the set of rules included in the second e-contract; record a third transaction record that reflects the third quantity of tokens to the blockchain; and transmit the content item from the influencer node to the first router node.

In Example 28, the subject matter of Examples 25-27 includes, wherein the first quantity of tokens is transferred by a miner node.

In Example 29, the subject matter of Examples 25-28 includes, wherein the content item is encrypted by the first router node before transmission to the consumer node.

In Example 30, the subject matter of Examples 21-29 includes, instructions that cause the at least one processor to: receive an interest packet for the content item from a consumer node; identify a contract included in the interest packet, wherein the contract specifies payment terms for the content item; generate a meter resource for the content item based on the contract; transmit a data packet to the influencer node that includes a reference to the meter resource, transmit the content to the consumer node in a content data packet that includes the reference to the meter resource; and generate billing data for the content to be delivered to the consumer node based on a path traversed by the content between the influencer node and the consumer node, the path indicated based on packet exchanges between nodes that include the reference to the meter resource.

In Example 31, the subject matter of Example 30 includes, wherein the content item is encrypted by the influencer node.

In Example 32, the subject matter of Examples 30-31 includes, wherein the payment terms for the content item are negotiated between the consumer node and the influencer node before transmission of the content item.

In Example 33, the subject matter of Examples 21-32 includes, instructions that cause the at least one processor to: identify a content category for the content item; calculate a popularity score for the content item category based on a number of content items requested within the ICN that are associated with the content category; and select the content item to be cached at the influencer node based on the content category associated with the content item and the popularity score of the content item category.

In Example 34, the subject matter of Example 33 includes, wherein the popularity score is calculated in part based on an evaluation of pending interest table data from nodes on the ICN.

In Example 35, the subject matter of Examples 33-34 includes, wherein the content item is selected in part based on the popularity score for the content item category being higher than a popularity score for another content item category.

In Example 36, the subject matter of Examples 33-35 includes, instructions that cause the at least one processor to calculate a reputation score for the content item, wherein selection of the content item includes using the reputation score.

In Example 37, the subject matter of Example 36 includes, wherein the reputation score is calculated based on a number of round trips for the content item on the ICN divided by a number of nodes on the ICN.

In Example 38, the subject matter of Examples 33-37 includes, instructions that cause the at least one processor to: identify a second content item associated with the content category; and cache the second content item at the influencer node based on the association between the second content item and the popularity score of the content item category.

Example 39 is at least one non-transitory machine-readable medium including instructions for information-centric network data cache management that, when executed by the at least one processor, cause the at least one processor to perform operations to: calculate a demand metric for a content item requested from an information-centric network (ICN), wherein the demand metric indicates an expected proliferation of the content item throughout the ICN; calculate, based on the demand metric, a resistance metric for each cache node of a set of cache nodes in the ICN, wherein the resistance metric indicates an ability of each cache node of the set of cache nodes to cache the content item; evaluate a topology of the set of cache nodes to identify a transmission cost for each cache node of the set of cache nodes, wherein the transmission cost indicates an average cost of transmission of the content between each cache node of the set of cache nodes and a set of content requester nodes; select an influencer node from the set of cache nodes based on the resistance metric for the influencer node and the transmission cost for the influencer node; and cache the content item in a data cache of the influencer node.

In Example 40, the subject matter of Example 39 includes, wherein the demand metric is calculated in part using a request velocity for the content item.

In Example 41, the subject matter of Examples 39-40 includes, wherein the resistance metric is calculated in part using a data output velocity of a respective cache node.

In Example 42, the subject matter of Examples 39-41 includes, instructions that cause the at least one processor to: determine a node cache capacity for each cache node of the set of cache nodes; determine a node computation capacity for each node of the set of cache nodes; determine an available bandwidth for each node of the set of cache nodes; and calculate an influencer score for each node of the set of cache nodes using the node cache capacity, node computation capacity, and available bandwidth, wherein the selection of the influencer node is based in part on the influencer score for the influencer node.

In Example 43, the subject matter of Examples 39-42 includes, instructions that cause the at least one processor to: receive, by a first router node, an interest packet that includes identification of the content item from a consumer node; determine a path to the influencer node; identify a first e-contract for the first router node, wherein the first e-contract specifies a set of rules to provided tokens to the first router node in exchange for delivery of content; transfer a first quantity of tokens from a consumer node digital wallet of the consumer node to a first router node digital wallet of the first router node based on the set of rules included in the first e-contract; record a first transaction record that reflects the first quantity of tokens to a blockchain; and transmit the content item from the influencer node to the consumer node via the first router node.

In Example 44, the subject matter of Example 43 includes, instructions that cause the at least one processor to transfer a second quantity of tokens from the influencer node to the first router based on the first e-contract and record a second transaction record that reflects the second quantity of tokens to the blockchain.

In Example 45, the subject matter of Examples 43-44 includes, instructions that cause the at least one processor to: identify a second e-contract for the influencer node, wherein the second e-contract specifies a set of rules to provide tokens to the influencer node in exchange for delivery of content; transfer a third quantity of tokens from the consumer node digital wallet of the consumer node to an influencer node digital wallet of the influencer node based on the set of rules included in the second e-contract; record a third transaction record that reflects the third quantity of tokens to the blockchain; and transmit the content item from the influencer node to the first router node.

In Example 46, the subject matter of Examples 43-45 includes, wherein the first quantity of tokens is transferred by a miner node.

In Example 47, the subject matter of Examples 43-46 includes, wherein the content item is encrypted by the first router node before transmission to the consumer node.

In Example 48, the subject matter of Examples 39-47 includes, instructions that cause the at least one processor to: receive an interest packet for the content item from a consumer node; identify a contract included in the interest packet, wherein the contract specifies payment terms for the content item; generate a meter resource for the content item based on the contract; transmit a data packet to the influencer node that includes a reference to the meter resource; transmit the content to the consumer node in a content data packet that includes the reference to the meter resource; and generate billing data for the content to be delivered to the consumer node based on a path traversed by the content between the influencer node and the consumer node, the path indicated based on packet exchanges between nodes that include the reference to the meter resource.

In Example 49, the subject matter of Example 48 includes, wherein the content item is encrypted by the influencer node.

In Example 50, the subject matter of Examples 48-49 includes, wherein the payment terms for the content item are negotiated between the consumer node and the influencer node before transmission of the content item.

In Example 51, the subject matter of Examples 39-50 includes, instructions that cause the at least one processor to: identify a content category for the content item; calculate a popularity score for the content item category based on a number of content items requested within the ICN that are associated with the content category; and select the content item to be cached at the influencer node based on the content category associated with the content item and the popularity score of the content item category.

In Example 52, the subject matter of Example 51 includes, wherein the popularity score is calculated in part based on an evaluation of pending interest table data from nodes on the ICN.

In Example 53, the subject matter of Examples 51-52 includes, wherein the content item is selected in part based on the popularity score for the content item category being higher than a popularity score for another content item category.

In Example 54, the subject matter of Examples 51-53 includes, instructions that cause the at least one processor to calculate a reputation score for the content item, wherein selection of the content item includes using the reputation score.

In Example 55, the subject matter of Example 54 includes, wherein the reputation score is calculated based on a number of round trips for the content item on the ICN divided by a number of nodes on the ICN.

In Example 56, the subject matter of Examples 51-55 includes, instructions that cause the at least one processor to: identify a second content item associated with the content category; and cache the second content item at the influencer node based on the association between the second content item and the popularity score of the content item category.

Example 57 is a system for information-centric network data cache management, the system comprising: means for calculating a demand metric for a content item requested from an information-centric network (ICN), the demand metric indicating an expected proliferation of the content item throughout the ICN; means for calculating, based on the demand metric, a resistance metric for each cache node of a set of cache nodes in the ICN, the resistance metric indicating an ability of each cache node of the set of cache nodes to cache the content item; means for evaluating a topology of the set of cache nodes to identify a transmission cost for each cache node of the set of cache nodes, the transmission cost indicating an average cost of transmitting the content between each cache node of the set of cache nodes and a set of content requester nodes; means for selecting an influencer node from the set of cache nodes based on the resistance metric for the influencer node and the transmission cost for the influencer node; and means for caching the content item in a data cache of the influencer node.

In Example 58, the subject matter of Example 57 includes, wherein the demand metric is calculated in part using a request velocity for the content item.

In Example 59, the subject matter of Examples 57-58 includes, wherein the resistance metric is calculated in part using a data output velocity of a respective cache node.

In Example 60, the subject matter of Examples 57-59 includes, means for determining a node cache capacity for each cache node of the set of cache nodes; means for determining a node computation capacity for each node of the set of cache nodes; means for determining an available bandwidth for each node of the set of cache nodes; and means for calculating an influencer score for each node of the set of cache nodes using the node cache capacity, node computation capacity, and available bandwidth, wherein selecting the influencer node is based in part on the influencer score for the influencer node.

In Example 61, the subject matter of Examples 57-60 includes, means for receiving, by a first router node, an interest packet including identification of the content item from a consumer node; means for determining a path to the influencer node; means for identifying a first e-contract for the first router node, the first e-contract specifying a set of rules for providing tokens to the first router node in exchange for delivery of content; means for transferring a first quantity of tokens from a consumer node digital wallet of the consumer node to a first router node digital wallet of the first router node based on the set of rules included in the first e-contract; means for recording a first transaction record reflecting the first quantity of tokens to a blockchain; and means for transmitting the content item from the influencer node to the consumer node via the first router node.

In Example 62, the subject matter of Example 61 includes, means for transferring a second quantity of tokens from the influencer node to the first router based on the first e-contract and means for recording a second transaction record reflecting the second quantity of tokens to the blockchain.

In Example 63, the subject matter of Examples 61-62 includes, means for identifying a second e-contract for the influencer node, the second e-contract specifying a set of rules for providing tokens to the influencer node in exchange for delivery of content; means for transferring a third quantity of tokens from the consumer node digital wallet of the consumer node to an influencer node digital wallet of the influencer node based on the set of rules included in the second e-contract; means for recording a third transaction record reflecting the third quantity of tokens to the blockchain; and means for transmitting the content item from the influencer node to the first router node.

In Example 64, the subject matter of Examples 61-63 includes, wherein the first quantity of tokens is transferred by a miner node.

In Example 65, the subject matter of Examples 61-64 includes, wherein the content item is encrypted by the first router node before transmission to the consumer node.

In Example 66, the subject matter of Examples 57-65 includes, means for receiving an interest packet for the content item from a consumer node; means for identifying a contract included in the interest packet, the contract specifying payment terms for the content item; means for generating a meter resource for the content item based on the contract; means for transmitting a data packet to the influencer node including a reference to the meter resource; means for transmitting the content to the consumer node in a content data packet that includes the reference to the meter resource; and means for generating billing data for the content to be delivered to the consumer node based on a path traversed by the content between the influencer node and the consumer node, the path indicated based on packet exchanges between nodes that include the reference to the meter resource.

In Example 67, the subject matter of Example 66 includes, wherein the content item is encrypted by the influencer node.

In Example 68, the subject matter of Examples 66-67 includes, wherein the payment terms for the content item are negotiated between the consumer node and the influencer node before transmission of the content item.

In Example 69, the subject matter of Examples 57-68 includes, means for identifying a content category for the content item; means for calculating a popularity score for the content item category based on a number of content items requested within the ICN that are associated with the content category; and means for selecting the content item for caching at the influencer node based on the content category associated with the content item and the popularity score of the content item category.

In Example 70, the subject matter of Example 69 includes, wherein the popularity score is calculated in part based on an evaluation of pending interest table data from nodes on the ICN.

In Example 71, the subject matter of Examples 69-70 includes, wherein the content item is selected in part based on the popularity score for the content item category being higher than a popularity score for another content item category.

In Example 72, the subject matter of Examples 69-71 includes, means for calculating a reputation score for the content item, wherein selection of the content item includes using the reputation score.

In Example 73, the subject matter of Example 72 includes, wherein the reputation score is calculated based on a number of round trips for the content item on the ICN divided by a number of nodes on the ICN.

In Example 74, the subject matter of Examples 69-73 includes, means for identifying a second content item associated with the content category; and means for caching the second content item at the influencer node based on the association between the second content item and the popularity score of the content item category.

Example 75 is at least one machine-readable medium including instructions that, when executed by processing circuitry, cause the processing circuitry to perform operations to implement of any of Examples 1-74.

Example 76 is an apparatus comprising means to implement of any of Examples 1-74.

Example 77 is a system to implement of any of Examples 1-74.

Example 78 is a method to implement of any of Examples 1-74.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for information-centric network data cache management, the system comprising:
   at least one processor; and
   memory including instructions that, when executed by the at least one processor, cause the at least one processor to perform operations to:
   calculate a demand metric for a content item requested in an interest packet from an information-centric network (ICN), wherein the demand metric indicates an expected proliferation of the content item throughout the ICN;
   calculate, based on the demand metric, a resistance metric for each cache node of a set of cache nodes in the ICN, wherein the resistance metric indicates an ability of each cache node of the set of cache nodes to cache the content item;
   evaluate a topology of the set of cache nodes to identify a transmission cost for each cache node of the set of cache nodes, wherein the transmission cost indicates an average cost of transmission of the content item between each cache node of the set of cache nodes and a set of content requester nodes;
   select an influencer node from the set of cache nodes based on the resistance metric for the influencer node and the transmission cost for the influencer node;
   identify a content item category for the content item;
   calculate a popularity score for the content item category based on a number of content items requested within the ICN that are associated with the content item category; and
   cache the content item in a data cache of the influencer node, based on the content item category associated with the content item and the popularity score of the content item category, to enable the influencer node to respond to interest packets requesting the content item with data packets comprising the content item.

2. The system of claim 1, further comprising instructions that cause the at least one processor to:
   determine a node cache capacity for each cache node of the set of cache nodes;
   determine a node computation capacity for each cache node of the set of cache nodes;
   determine an available bandwidth for each cache node of the set of cache nodes; and
   calculate an influencer score for each cache node of the set of cache nodes using the node cache capacity, node computation capacity, and available bandwidth, wherein the selection of the influencer node is based in part on the influencer score for the influencer node.

3. The system of claim 1, further comprising instructions that cause the at least one processor to:
   receive, by a first router node, an interest packet that includes identification of the content item from a consumer node;
   determine a path to the influencer node;
   identify a first e-contract for the first router node, wherein the first e-contract specifies a set of rules to provide tokens to the first router node in exchange for delivery of content;
   transfer a first quantity of tokens from a consumer node digital wallet of the consumer node to a first router node digital wallet of the first router node based on the set of rules included in the first e-contract;
   record a first transaction record that reflects the first quantity of tokens to a blockchain; and
   transmit the content item from the influencer node to the consumer node via the first router node.

4. The system of claim 3, further comprising instructions that cause the at least one processor to:
   identify a second e-contract for the influencer node, wherein the second e-contract specifies a set of rules to provide tokens to the influencer node in exchange for delivery of content;
   transfer a third quantity of tokens from the consumer node digital wallet of the consumer node to an influencer node digital wallet of the influencer node based on the set of rules included in the second e-contract;
   record a third transaction record that reflects the third quantity of tokens to the blockchain; and
   transmit the content item from the influencer node to the first router node.

5. The system of claim 1, further comprising instructions that cause the at least one processor to:
   receive an interest packet for the content item from a consumer node;
   identify a contract included in the interest packet, wherein the contract specifies payment terms for the content item;
   generate a meter resource for the content item based on the contract;
   transmit a data packet to the influencer node that includes a reference to the meter resource;
   transmit the content item to the consumer node in a content data packet that includes the reference to the meter resource; and
   generate billing data for the content item to be delivered to the consumer node based on a path traversed by the content item between the influencer node and the consumer node, the path indicated based on packet exchanges between nodes that include the reference to the meter resource.

6. The system of claim 1, further comprising instructions that cause the at least one processor to:
   identify a second content item associated with the content item category; and
   cache the second content item at the influencer node based on the association between the second content item and the popularity score of the content item category.

7. The system of claim 1, wherein the demand metric is calculated in part using a request velocity for the content item; or
   wherein the resistance metric is calculated in part using a data output velocity of a respective cache node.

8. At least one non-transitory machine-readable medium including instructions for information-centric network data cache management that, when executed by the at least one processor, cause the at least one processor to perform operations to:
   calculate a demand metric for a content item requested in an interest packet from an information-centric network (ICN), wherein the demand metric indicates an expected proliferation of the content item throughout the ICN;
   calculate, based on the demand metric, a resistance metric for each cache node of a set of cache nodes in the ICN, wherein the resistance metric indicates an ability of each cache node of the set of cache nodes to cache the content item;

evaluate a topology of the set of cache nodes to identify a transmission cost for each cache node of the set of cache nodes, wherein the transmission cost indicates an average cost of transmission of the content item between each cache node of the set of cache nodes and a set of content requester nodes;

select an influencer node from the set of cache nodes based on the resistance metric for the influencer node and the transmission cost for the influencer node;

identify a content item category for the content item;

calculate a popularity score for the content item category based on a number of content items requested within the ICN that are associated with the content item category; and cache the content item in a data cache of the influencer node, based on the content item category associated with the content item and the popularity score of the content item category, to enable the influencer node to respond to interest packets requesting the content item with data packets comprising the content item.

9. The at least one non-transitory machine-readable medium of claim 8, further comprising instructions that cause the at least one processor to:

determine a node cache capacity for each cache node of the set of cache nodes;

determine a node computation capacity for each cache node of the set of cache nodes;

determine an available bandwidth for each cache node of the set of cache nodes; and calculate an influencer score for each cache node of the set of cache nodes using the node cache capacity, node computation capacity, and available bandwidth, wherein the selection of the influencer node is based in part on the influencer score for the influencer node.

10. The at least one non-transitory machine-readable medium of claim 8, further comprising instructions that cause the at least one processor to:

receive, by a first router node, an interest packet that includes identification of the content item from a consumer node;

determine a path to the influencer node;

identify a first e-contract for the first router node, wherein the first e-contract specifies a set of rules to provide tokens to the first router node in exchange for delivery of content;

transfer a first quantity of tokens from a consumer node digital wallet of the consumer node to a first router node digital wallet of the first router node based on the set of rules included in the first e-contract;

record a first transaction record that reflects the first quantity of tokens to a blockchain; and transmit the content item from the influencer node to the consumer node via the first router node.

11. The at least one non-transitory machine-readable medium of claim 10, further comprising instructions that cause the at least one processor to:

identify a second e-contract for the influencer node, wherein the second e-contract specifies a set of rules to provide tokens to the influencer node in exchange for delivery of content;

transfer a third quantity of tokens from the consumer node digital wallet of the consumer node to an influencer node digital wallet of the influencer node based on the set of rules included in the second e-contract;

record a third transaction record that reflects the third quantity of tokens to the blockchain; and transmit the content item from the influencer node to the first router node.

12. The at least one non-transitory machine-readable medium of claim 8, further comprising instructions that cause the at least one processor to:

receive an interest packet for the content item from a consumer node;

identify a contract included in the interest packet, wherein the contract specifies payment terms for the content item;

generate a meter resource for the content item based on the contract;

transmit a data packet to the influencer node that includes a reference to the meter resource;

transmit the content item to the consumer node in a content data packet that includes the reference to the meter resource; and generate billing data for the content item to be delivered to the consumer node based on a path traversed by the content item between the influencer node and the consumer node, the path indicated based on packet exchanges between nodes that include the reference to the meter resource.

13. The at least one non-transitory machine-readable medium of claim 8, further comprising instructions that cause the at least one processor to:

identify a second content item associated with the content item category; and cache the second content item at the influencer node based on the association between the second content item and the popularity score of the content item category.

14. The at least one non-transitory machine-readable medium of claim 8, wherein the demand metric is calculated in part using a request velocity for the content item; or wherein the resistance metric is calculated in part using a data output velocity of a respective cache node.

15. A method for information-centric network data cache management, the method comprising:

calculating a demand metric for a content item requested in an interest packet from an information-centric network (ICN), the demand metric indicating an expected proliferation of the content item throughout the ICN;

calculating, based on the demand metric, a resistance metric for each cache node of a set of cache nodes in the ICN, the resistance metric indicating an ability of each cache node of the set of cache nodes to cache the content item;

evaluating a topology of the set of cache nodes to identify a transmission cost for each cache node of the set of cache nodes, the transmission cost indicating an average cost of transmitting the content item between each cache node of the set of cache nodes and a set of content requester nodes;

selecting an influencer node from the set of cache nodes based on the resistance metric for the influencer node and the transmission cost for the influencer node;

identifying a content item category for the content item;

calculating a popularity score for the content item category based on a number of content items requested within the ICN that are associated with the content item category; and caching the content item in a data cache of the influencer node, based on the content item category associated with the content item and the popularity score of the content item category, to enable the influencer node to respond to interest packets requesting the content item with data packets comprising the content item.

16. The method of claim 15, further comprising:
determining a node cache capacity for each cache node of the set of cache nodes;
determining a node computation capacity for each cache node of the set of cache nodes;
determining an available bandwidth for each cache node of the set of cache nodes; and
calculating an influencer score for each cache node of the set of cache nodes using the node cache capacity, node computation capacity, and available bandwidth, wherein selecting the influencer node is based in part on the influencer score for the influencer node.

17. The method of claim 15, further comprising:
receiving, by a first router node, an interest packet including identification of the content item from a consumer node;
determining a path to the influencer node;
identifying a first e-contract for the first router node, the first e-contract specifying a set of rules for providing tokens to the first router node in exchange for delivery of content;
transferring a first quantity of tokens from a consumer node digital wallet of the consumer node to a first router node digital wallet of the first router node based on the set of rules included in the first e-contract;
recording a first transaction record reflecting the first quantity of tokens to a blockchain; and
transmitting the content item from the influencer node to the consumer node via the first router node.

18. The method of claim 17, further comprising:
identifying a second e-contract for the influencer node, the second e-contract specifying a set of rules for providing tokens to the influencer node in exchange for delivery of content;
transferring a third quantity of tokens from the consumer node digital wallet of the consumer node to an influencer node digital wallet of the influencer node based on the set of rules included in the second e-contract;
recording a third transaction record reflecting the third quantity of tokens to the blockchain; and
transmitting the content item from the influencer node to the first router node.

19. The method of claim 15, further comprising:
receiving an interest packet for the content item from a consumer node;
identifying a contract included in the interest packet, the contract specifying payment terms for the content item;
generating a meter resource for the content item based on the contract;
transmitting a data packet to the influencer node including a reference to the meter resource;
transmitting the content item to the consumer node in a content data packet that includes the reference to the meter resource; and
generating billing data for the content item to be delivered to the consumer node based on a path traversed by the content item between the influencer node and the consumer node, the path indicated based on packet exchanges between nodes that include the reference to the meter resource.

20. The method of claim 15, further comprising:
identifying a second content item associated with the content item category; and
caching the second content item at the influencer node based on the association between the second content item and the popularity score of the content item category.

21. The method of claim 15, wherein the demand metric is calculated in part using a request velocity for the content item; or
wherein the resistance metric is calculated in part using a data output velocity of a respective cache node.

* * * * *